United States Patent
Papasakellariou et al.

(10) Patent No.: US 9,144,065 B2
(45) Date of Patent: Sep. 22, 2015

(54) COMMUNICATION SUPPORT FOR LOW CAPABILITY DEVICES

(71) Applicant: Samsung Electronics Co., Ltd., Gyeonggi-do (KR)

(72) Inventors: Aris Papasakellariou, Houston, TX (US); Hyoung-Ju Ji, Seoul (KR); Young-Bum Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 115 days.

(21) Appl. No.: 13/715,174

(22) Filed: Dec. 14, 2012

(65) Prior Publication Data

US 2013/0155974 A1 Jun. 20, 2013

Related U.S. Application Data

(60) Provisional application No. 61/576,695, filed on Dec. 16, 2011.

(51) Int. Cl.
*H04W 4/00* (2009.01)
*H04W 72/04* (2009.01)
*H04L 1/00* (2006.01)
*H04W 24/10* (2009.01)
*H04L 1/16* (2006.01)
*H04L 1/18* (2006.01)

(52) U.S. Cl.
CPC ........... *H04W 72/042* (2013.01); *H04L 1/0026* (2013.01); *H04L 1/0027* (2013.01); *H04L 1/0029* (2013.01); *H04L 1/0067* (2013.01); *H04L 1/0071* (2013.01); *H04L 1/0072* (2013.01); *H04L 1/1607* (2013.01); *H04L 1/1812* (2013.01); *H04L 2001/0093* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 2007/0259672 A1 | 11/2007 | Heo et al. | |
| 2010/0113004 A1 | 5/2010 | Cave et al. | |
| 2011/0299492 A1* | 12/2011 | Lee et al. | 370/329 |
| 2012/0254890 A1* | 10/2012 | Li et al. | 719/313 |
| 2013/0114587 A1* | 5/2013 | Khoryaev et al. | 370/343 |
| 2013/0286957 A1* | 10/2013 | Bucknell et al. | 370/329 |
| 2013/0315215 A1* | 11/2013 | Beale | 370/336 |
| 2014/0031052 A1* | 1/2014 | Lagerqvist et al. | 455/452.1 |

FOREIGN PATENT DOCUMENTS

| | | |
|---|---|---|
| KR | 1020110088452 | 8/2011 |
| WO | WO 2009/128677 | 10/2009 |
| WO | WO 2010/107604 | 9/2010 |

* cited by examiner

*Primary Examiner* — Anh-Vu Ly
(74) *Attorney, Agent, or Firm* — The Farrell Law Firm, P.C.

(57) ABSTRACT

Methods and apparatuses for transmitting and receiving signaling, by a User Equipment (UE) with reduced processing capabilities, to conserve power are provided. A method for transmitting from a network a Physical Downlink Shared CHannel (PDSCH) to a first User Equipment (UE) from a first class of UEs or to a second UE from a second class of UEs, includes transmitting a PDSCH to the first UE using a first bandwidth unit; and transmitting a PDSCH to the second UE using a second bandwidth unit, wherein the second bandwidth unit is smaller than the first bandwidth unit.

12 Claims, 17 Drawing Sheets

COMMUNICATION SUPPORT FOR LOW CAPABILITY DEVICES

PRIORITY

The present application claims priority under 35 U.S.C. §119(e) to U.S. Provisional Application No. 61/576,695 which was filed in the United States Patent and Trademark Office on Dec. 16, 2011, the entire content of which is incorporated herein by reference.

BACKGROUND OF THE INVENTION

1. Field of the Invention

The present invention relates generally to wireless communication systems and, more particularly, to the transmission and reception of control channels and data channels to and from, respectively, UEs with limited capabilities.

2. Description of the Art

A communication system includes a DownLink (DL) that conveys transmission signals from transmission points such as Base Stations (BSs) (which may also be referred to as NodeBs) to User Equipments (UEs) and an UpLink (UL) that conveys transmission signals from UEs to reception points such as NodeBs. A UE, also commonly referred to as a terminal or a mobile station, may be fixed or mobile, and may be a device such as a cellular phone, a personal computer device, etc. A NodeB, which is generally a fixed station, may also be referred to as an access point or other equivalent terminology.

DL signals include data signals, which carry information content, control signals, and Reference Signals (RSs), which are also known as pilot signals. A NodeB conveys data information to UEs through respective Physical Downlink Shared CHannels (PDSCHs) and control information through respective Physical Downlink Control CHannels (PDCCHs). Multiple RS types may be supported, such as a Common RS (CRS) transmitted over substantially the entire DL BandWidth (BW) and the DeModulation RS (DMRS) transmitted in a same BW as an associated PDSCH.

UL signals also include data signals, control signals, and RSs. UEs convey data information to NodeBs through respective Physical Uplink Shared CHannels (PUSCHs) and control information through respective Physical Uplink Control CHannels (PUCCHs). A UE transmitting data information may also convey control information through a PUSCH. The RS may be a DMRS or a Sounding RS (SRS), which a UE may transmit independently of a PUSCH.

Downlink Control Information (DCI) serves several purposes, and is conveyed through DCI formats in respective PDCCHs. For example, DCI includes DL Scheduling Assignments (SAs) for PDSCH reception and UL SAs for PUSCH transmissions. As PDCCHs are a major part of a total DL overhead, the resources required to transmit PDCCHs directly reduce DL throughput. One method for reducing PDCCH overhead is to scale it's the size of the overhead according to the resources required to transmit the DCI formats during a DL Transmission Time Interval (TTI). When Orthogonal Frequency Division Multiple (OFDM) is used as a DL transmission method, a Control Channel Format Indicator (CCFI) parameter transmitted through a Physical Control Format Indicator CHannel (PCFICH) can be used to indicate a number of OFDM symbols occupied by PDCCHs in a DL TTI.

FIG. 1 is a diagram illustrating a conventional structure for PDCCH transmissions in a DL TTI.

Referring to FIG. 1, a DL TTI includes one subframe having a number N of OFDM symbols. In the present example, N=14. A DL control region that includes PDCCH transmissions occupies a first M OFDM symbols 110. A remaining N-M OFDM symbols are used primarily for PDSCH transmissions 120. A PCFICH 130 is transmitted in some sub-carriers, also referred to as Resource Elements (REs), of a first OFDM symbol and includes 2 bits indicating a DL control region size of M=1, or M=2, or M=3 OFDM symbols. Moreover, some OFDM symbols also contain respective RS REs 140 and 150. These RSs 140 and 150 are transmitted substantially over an entire DL operating BandWidth (BW), and are referred to as Common RSs (CRSs), as they can be used by each UE to obtain a channel estimate for its DL channel medium and to perform other measurements. The BW unit for a PDSCH or a PUSCH over a subframe is referred to as a Physical Resource Block (PRB). A PRB includes several REs, such as 12 Res, for example.

A PDCCH and a PCFICH transmitted with the conventional structure in FIG. 1 are referred to as C-PDCCH and a C-PCFICH, respectively. Additional control channels may be transmitted in a DL control region but are not shown for brevity. For example, when using a Hybrid Automatic Repeat reQuest (HARQ) process for a transmission of data Transport Blocks (TBs) in a PUSCH, a NodeB may transmit HARQ-ACKnowledgement (ACK) information in a Physical Hybrid-HARQ Indicator CHannel (PHICH) to indicate to a UE whether its previous transmission of each data Transport Block (TB) in a PUSCH was correctly received (i.e., through an ACK) or incorrectly received (i.e., through a Negative ACK (NACK)). A PHICH transmitted with a conventional structure is referred to as C-PHICH. The aforementioned conventional DL control channels will be jointly referred to as C-CCHs.

FIG. 2 is a diagram illustrating a conventional encoding and transmission process for a DCI format.

Referring to FIG. 2, a NodeB separately codes and transmits each DCI format in a respective PDCCH. A Radio Network Temporary Identifier (RNTI) for a UE, for which a DCI format is intended for, masks a Cyclic Redundancy Check (CRC) of a DCI format codeword in order to enable the UE to identify that a particular DCI format is intended for the UE. The CRC of (non-coded) DCI format bits 210 is computed using a CRC computation operation 220, and the CRC is then masked using an exclusive OR (XOR) operation 230 between CRC and RNTI bits 240. The XOR operation 230 is defined as: XOR(0,0)=0, XOR(0,1)=1, XOR(1,0)=1, XOR(1,1)=0. The masked CRC bits are appended to DCI format information bits using a CRC append operation 250, channel coding is performed using a channel coding operation 260 (e.g. an operation using a convolutional code), followed by rate matching operation 270 applied to allocated resources, and finally, an interleaving and a modulation 280 operation are performed, and the output control signal 290 is transmitted. In the present example, both a CRC and a RNTI include 16 bits.

FIG. 3 is a diagram illustrating a conventional reception and decoding process for a DCI format.

Referring to FIG. 3, a UE receiver performs a reverse of the operations performed by the NodeB transmitter in order to determine whether the UE has a DCI format assignment in a DL subframe. A received control signal 310 is demodulated and the resulting bits are de-interleaved at operation 320, a rate matching applied at a NodeB transmitter is restored through operation 330, and data is subsequently decoded at operation 440. After decoding the data, DCI format information bits 360 are obtained after extracting CRC bits 350, which are then de-masked 370 by applying the XOR operation with a UE RNTI 380. Finally, a UE performs a CRC test 390. If the CRC test passes, a UE determines that a DCI format corresponding to the received control signal 310 is valid and determines parameters for signal reception or signal transmission. If the CRC test does not pass, a UE disregards the presumed DCI format.

The DCI format information bits correspond to several Information Elements (IEs) such as, for example, the Resource Allocation (RA) IE indicating the part of the DL BW or UL BW allocated to a UE for PDSCH reception or PUSCH transmission, respectively, the Modulation and Coding Scheme (MCS) IE indicating the data MCS, the Transmission Power Control (TPC) IE indicating an adjustment to the PUSCH transmission power or to the HARQ-ACK signal transmission power in a PUCCH, the New Data Indicator (NDI) IE informing a UE whether the scheduled data TB corresponds to a new transmission or to a retransmission for the same HARQ process, and so on.

In order to avoid a C-PDCCH transmission to a UE that blocks a C-PDCCH transmission to another UE, a location of each C-PDCCH in the time-frequency domain of a DL control region is not unique. Therefore, a UE may perform multiple decoding operations per DL subframe to determine whether there are any C-PDCCHs intended for the UE in a DL subframe. The REs carrying a PDCCH are grouped into Control Channel Elements (CCEs) in the logical domain. For a given number of DCI format bits in FIG. 2, a number of CCEs for a respective C-PDCCH depends on a channel coding rate (Quadrature Phase Shift Keying (QPSK) is the modulation scheme in the present example). A NodeB may use a lower channel coding rate (i.e., more CCEs) for transmitting PDCCHs to UEs experiencing a low DL Signal-to-Interference and Noise Ratio (SINR) than to UEs experiencing a high DL SINR. The CCE aggregation levels may include, for example, 1, 2, 4, and 8 CCEs.

For a C-PDCCH decoding process, a UE may determine a search space for candidate C-PDCCH transmissions after the UE restores the CCEs in the logical domain according to a common set of CCEs for all UEs (i.e., a Common Search Space (CSS)) and according to a UE-dedicated set of CCEs (i.e., a UE-Dedicated Search Space (UE-DSS)). A CSS may include the first C CCEs in the logical domain. A UE-DSS may be determined according to a pseudo-random function having UE-common parameters as inputs, such as the subframe number or the total number of CCEs in the subframe, and UE-specific parameters such as the RNTI. For example, for CCE aggregation levels $L \in \{1,2,4,8\}$, the CCEs corresponding to PDCCH candidate m are given by Equation (1)

$$\text{CCEs for C-PDCCH candidate } m = L \cdot \{(Y_k + m) \bmod \lfloor N_{CCE,k}/L \rfloor\} + i \quad (1)$$

In Equation (1), $N_{CCE,k}$ is the total number of CCEs in subframe k, $i=0, \ldots, L-1$, $m=0, \ldots, M_C^{(L)}-1$, and $M_C^{(L)}$ is the number of C-PDCCH candidates to monitor in the search space. Exemplary values of $M_C^{(L)}$ for $L \in \{1,2,4,8\}$ are, respectively, $\{6, 6, 2, 2\}$. For the UE-CSS, $Y_k=0$. For the UE-DSS, $Y_k=(A \cdot Y_{k-1}) \bmod D$, where $Y_{-1}=\text{UE\_RNTI} \neq 0$, $A=39827$, and $D=65537$.

DCI formats conveying information to multiple UEs are transmitted in a CSS. Additionally, if enough CCEs remain after the transmission of DCI formats conveying information to multiple UEs, a CSS may also convey some DCI formats for PDSCH reception or PUSCH transmission. A UE-DSS exclusively conveys DCI formats for PDSCH reception or PUSCH transmission. For example, a CSS may include 16 CCEs and support 2 DCI formats with L=8 CCEs, or 4 DCI formats with L=4 CCEs, or 1 DCI format with L=8 CCEs and 2 DCI formats with L=4 CCEs. The CCEs for a CSS are placed first in the logical domain (prior to interleaving).

FIG. 4 is a diagram illustrating a conventional transmission process of a DCI format in a respective C-PDCCH.

Referring to FIG. 4, after channel coding and rate matching are performed (as described with reference to FIG. 2), encoded DCI format bits are mapped to C-PDCCH CCEs in the logical domain. The first 4 CCEs (L=4), CCE1 401, CCE2 402, CCE3 403, and CCE4 404 are used for C-PDCCH transmission to UE1. The next 2 CCEs (L=2), CCE5 411 and CCE6 412, are used for C-PDCCH transmission to UE2. The next 2 CCEs (L=2), CCE7 421 and CCE8 422, are used for C-PDCCH transmission to UE3. Finally, the last CCE (L=1), CCE9 431, is used for C-PDCCH transmission to UE4.

The DCI format bits are then scrambled, at step 440, by a binary scrambling code, and the scrambled bits are modulated at step 450. Each CCE is further divided into Resource Element Groups (REGs). For example, a CCE including 36 REs can be divided into 9 REGs, such that each REG includes 4 REs. In step 460, interleaving is applied among REGs in blocks of four QPSK symbols. For example, a block interleaver may be used where interleaving is performed on symbol-quadruplets (i.e., four QPSK symbols corresponding to the four REs of a REG) instead of on individual bits. After interleaving the REGs, in step 470, a resulting series of QPSK symbols may be shifted by J symbols, and finally, in step 480, each QPSK symbol is mapped to an RE in a DL control region. Therefore, in addition to RSs from NodeB transmitter antennas 491 and 492, and other control channels, such as a PCFICH 493 and a PHICH (not shown), REs in a DL control region contain QPSK symbols for PDCCHs corresponding to DCI formats for UE1 494, UE2 495, UE3 496, and UE4 497.

The C-PDCCH structure in FIG. 4 uses a maximum of M=3 OFDM symbols and transmits the signal substantially over a total DL BW. As a consequence of using such a structure, such a control region has a limited capacity, and therefore cannot achieve interference coordination in the frequency domain. There are several cases where expanded capacity or interference coordination in the frequency domain is needed for transmission of control signals. One such case is the extensive use of spatial multiplexing for PDSCH transmissions, where multiple DL SAs correspond to the same PDSCH resources. Another case is for heterogeneous networks where DL transmissions in a first cell experience strong interference from DL transmissions in a second cell and DL interference coordination in the frequency domain between the two cells is needed.

Due to REG-based transmission and interleaving of C-PDCCHs, the control region cannot be expanded to include more OFDM symbols while maintaining compatible operation with existing UEs that cannot be aware of such an expansion. An alternative to the REG-based transmission and interleaving of C-PDCCHs is to extend the control region in the PDSCH region and use individual PRBs for transmitting new PDCCHs, which are referred to as Enhanced PDCCHs (E-PDCCHs).

FIG. 5 is a diagram illustrating a conventional E-PDCCH transmission structure.

Referring to FIG. 5, although E-PDCCH transmissions start immediately after C-PDCCH transmissions 510 and are transmitted over all remaining DL subframe symbols, they may instead always start at a fixed location, such as the fourth OFDM symbol. E-PDCCH transmissions occur in four PRBs, 620, 630, 640, and 650, while remaining PRBs 660, 662, 664, 666, 668 are used for PDSCH transmissions. As an E-PDCCH transmission over a given number of subframe symbols may require fewer REs than the number of subframe symbols available in a PRB, multiple E-PDCCHs may be multiplexed in a same PRB. The multiplexing can be in any combination of possible domains (i.e., time domain, frequency domain, or spatial domain) and, in a manner similar to a PDCCH, an E-PDCCH includes at least one Enhanced CCE (E-CCE).

A transmission for an extended control channel (E-PDCCH, E-PCFICH, E-PHICH) may be in a same PRB, in which case the transmission is referred to as localized, or over multiple PRBs, in which case the transmission is referred to as distributed. The aforementioned Enhanced Control CHannels are jointly referred to as E-CCHs. The demodulation of information in an E-CCH may be based on a CRS or on a DMRS.

FIG. 6 is a diagram illustrating a conventional DMRS structure.

Referring to FIG. 6, DMRS REs 610 are placed in some OFDM symbols of a PRB. When there are two NodeB transmitter antenna ports, a first DMRS transmission is assumed to apply the Orthogonal Covering Code (OCC) of $\{1, 1\}$ over two DMRS REs that are located in a same frequency position and are successive in the time domain while a second DMRS transmission is assumed to apply the OCC of $\{1, -1\}$. A UE receiver can estimate the channel experienced by the signal from each NodeB transmitter antenna port by removing a respective OCC.

UL Control Information (UCI) is transmitted from a UE to a NodeB to facilitate PDSCH transmissions or PUSCH transmissions. UCI includes HARQ-ACK information associated with a transmission of one or more Transport Blocks (TBs) in a PDSCH, Channel State Information (CSI) informing a NodeB about a channel experienced by DL transmissions to a UE, and Service Request (SR) informing a NodeB that a UE has data to transmit. CSI may include a Channel Quality Indicator (CQI), which implicitly or explicitly informs a NodeB of a wideband or a sub-band SINR experienced by a UE, a Precoding Matrix Indicator (PMI), which informs of an entry in a precoding matrix for a NodeB to apply beamforming to a DL signal transmission, or a Rank Indicator (RI) which informs a NodeB that a UE can support spatial multiplexing for a DL signal transmission.

FIG. 7 is a diagram illustrating a conventional structure for a HARQ-ACK signal transmission in one of the two subframe slots of a PUCCH.

Referring to FIG. 7, HARQ-ACK signals and RS that enable coherent demodulation of HARQ-ACK signals are transmitted in one slot 710 of a PUCCH subframe including 2 slots. The transmission in the other slot can be at a different part of the UL BW. HARQ-ACK information bits 720 modulate 730 a Zadoff-Chu (ZC) sequence 740, for example using Binary Phase Shift Keying (BPSK) for 1 HARQ-ACK bit or QPSK for 2 HARQ-ACK bits, which is then transmitted after performing a Inverse Fast Fourier Transform (IFFT) operation 750. Each RS 760 is transmitted using an unmodulated ZC sequence.

For a UL system BW including $N_{RB}^{max, UL}$ RBs, where each RB includes $N_{sc}^{RB}=12$ REs, a ZC sequence $r_{u,v}^{(\alpha)}(n)$ can be defined by a Cyclic Shift (CS) $\alpha$ of a base ZC sequence $\bar{r}_{u,v}(n)$ according to $r_{u,v}^{(\alpha)}(n)=e^{j\alpha n}\bar{r}_{u,v}(n)$, $0 \le n < M_{sc}^{RS}$, where $M_{sc}^{RS}=mN_{sc}^{RB}$ is a length of the ZC sequence, $1 \le m \le N_{RB}^{max, UL}$, and $\bar{r}_{u,v}(n)=x_q(n \bmod N_{ZC}^{RS})$ where a $q^{th}$ root ZC sequence is defined by $$x_q(m) = \exp\left(\frac{-j\pi qm(m+1)}{N_{ZC}^{RS}}\right),$$

$0 \le m \le N_{ZC}^{RS}-1$ with q given by $q=\lfloor \bar{q}+1/2 \rfloor + v \cdot (-1)^{\lfloor 2\bar{q} \rfloor}$ and $\bar{q}$ given by $\bar{q}=N_{ZC}^{RS} \cdot (u+1)/31$. A length $N_{ZC}^{RS}$ of a ZC sequence is given by a largest prime number such that $N_{ZC}^{RS} < M_{sc}^{RS}$. Multiple RS sequences can be defined from a single base sequence through different values of $\alpha$. A PUCCH transmission is assumed to be in one RB ($M_{sc}^{RS}=N_{sc}^{RB}$).

FIG. 8 is a diagram illustrating a conventional structure for a periodic CSI signal transmission in one of the two subframe slots of a PUCCH.

Referring to FIG. 8, CSI signals and RSs that enable coherent demodulation of CSI signals are transmitted in one slot 810 of a PUCCH subframe including 2 slots. The transmission in the other slot can be at a different part of the UL BW. After encoding (using for example a block code) and modulation (using for example QPSK) which are not shown for brevity, encoded CSI bits 820 modulate 830 a ZC sequence 840 which is then transmitted after performing an IFFT operation 840. Each RS 850 is transmitted using an unmodulated ZC sequence.

FIG. 9 is a diagram illustrating a transmitter for a ZC sequence for which, without modulation, serves as an RS and with modulation serves as a HARQ-ACK signal or as a CSI signal.

Referring to FIG. 9, a mapper 920 maps a ZC sequence 910 to REs of an assigned transmission BW as they are indicated by RE selection unit 925. Subsequently, an IFFT is performed by IFFT unit 930, a CS is applied to the output by CS unit 940, followed by scrambling with a cell-specific sequence using scrambler 950, a Cyclic Prefix (CP) is inserted by CP insertion unit 960, and the resulting signal is filtered by filter 970. Finally, a transmission power $P_{PUCCH}$ is applied by power amplifier 980 and a ZC sequence is transmitted 990. The reverse of these operations is performed at a NodeB receiver.

Different CSs of a ZC sequence provide orthogonal ZC sequences. Therefore, different CSs $\alpha$ of a same ZC sequence can be allocated to different UEs in a same PUCCH RB and achieve orthogonal multiplexing for HARQ-ACK signals and RS or for CSI signals and RS. For a RB including $N_{sc}^{RB}=12$ REs, there are 12 different CSs. A number of usable CSs depends on the channel dispersion characteristics, and can typically range between 3 and 12 CSs. Orthogonal multiplexing can also be in the time domain using OCC where PUCCH symbols conveying a same signal type in each slot are multiplied with elements of an OCC. For example, for the structure in FIG. 7, a HARQ-ACK signal transmission can be modulated by a length-4 OCC, such as a Walsh-Hadamard (WH) OCC, while an RS transmission can be modulated by a length-3 OCC, such as a DFT OCC. In this manner, the multiplexing capacity is increased by a factor of 3 (determined by the OCC with the smaller length $N_{oc}$).

UEs may communicate over a total system BW or over only a part of the system BW. The former UEs can benefit from most or all network capabilities for PDSCH receptions or PUSCH transmissions, are typically used by humans, and are referred to as conventional UEs herein. The latter UEs have substantially reduced capabilities compared to the former UEs in order to substantially reduce their cost, are typically associated with machines, and are referred to as Machine Type Communication (MTC) UEs herein.

MTC UEs are low cost devices targeting various low data rate traffic applications including smart metering, intelligent transport systems, consumer electronics, and medical devices. Typical traffic patterns from MTC UEs are characterized by low duty cycles and small data packets in the order of a few tens or a few hundred bytes. MTC UEs have typically low mobility, but high mobility MTCs, such as in motor vehicles, for example, may also exist. Also, unlike conventional UEs, MTC UEs generate more UL than DL traffic and a majority of DL traffic is higher layer control information, such as Radio Resource Control (RRC) information, for configuration of a communication with a NodeB.

Unlike conventional UEs, such as for example a smartphone, which may have many features, MTC UEs only have a minimum of necessary features, and the modem is a primary contributor to the cost of an MTC UE. Therefore, main cost drivers for MTC UEs are Radio Frequency (RF) components and Digital Base-Band (DBB) components mainly for the receiver. RF components include the power amplifier, filters, transceiver radio chains, and possibly a duplexer (for full duplex FDD operation). DBB components include a channel estimator, a channel equalizer, a PDCCH decoder, a PDSCH decoder, and a subframe buffer. For example, a channel estimator may be based on a Minimum Mean Square Error (MMSE) estimator, a channel equalizer may be an FFT, a PDCCH decoder may be a decoder for a Tail Biting Convolutional Code (TBCC), and the data decoder may be a decoder for a Turbo Code (TC) or a TBCC.

RF costs are related to implementation and production methods as well as to design choices. For example, considering economies of scale, it may be more cost effective to use the same amplifier for conventional UEs and MTC UEs, which will also ensure a same UL coverage, while the number of transmitter antennas for MTC UEs may be limited to one antenna.

DBB costs are related to the communication capabilities of MTC UEs and are dominated by the receiver complexity, which is typically about an order of magnitude larger than the transmitter complexity. As the channel estimator complexity, the FFT complexity and the subframe buffering requirements are directly associated to the reception BW, DL transmissions to MTC UEs may be over a smaller BW than DL transmissions to conventional UEs. For example, DL transmissions to MTC UEs may be over a 1.4 MHz BW while DL transmissions to conventional UEs may be over a 20 MHz BW.

A complexity of a PDCCH decoder depends on a number of decoding operations an MTC UE needs to perform per DL subframe. As MTC UEs do not need to support a same number of transmission modes (TMs) as conventional UEs, for example MTC UEs may not need to support spatial multiplexing for PDSCH or for PUSCH, a maximum number of decoding operations per DL subframe can be significantly smaller than that for conventional UEs. A complexity of a PDSCH decoder depends on a maximum supportable data rate. Allowing for a relatively small maximum data rate for MTC UEs provides a limit to an associated decoder complexity.

MTC UEs generally access the communication system in the same manner as conventional UEs. Synchronization signals are first acquired to establish synchronization with a NodeB followed by a detection of a Broadcast CHannel (BCH) that conveys essential information for subsequent communication between a NodeB and UEs (conventional or MTC ones). Regardless of a DL BW, synchronization signals and BCH are transmitted over a minimum DL BW located in the center of a DL BW, such as in the middle six RBs of a DL BW, and over a number of OFDM symbols in a subframe, for example. After establishing communication with a NodeB, a different part of a DL BW may be allocated to an MTC UE.

One aspect of supporting communication of MTC UEs is a design of DL control signaling. As transmissions of C-CCHs are distributed substantially over a total DL system BW, if MTC UEs receive DL transmissions only in a BW smaller than the total BW, the MTC UEs may not be able to decode C-CCHs. The use of E-CCHs can provide DL control signaling support for MTC UEs, but due to reduced receiver DBB capabilities of MTC UEs, it may not be possible to use a same design of E-CCHs for MTC UEs and for conventional UEs.

Another aspect of supporting communication of MTC UEs is a reduction in an overhead associated with DL control signaling and UL control signaling for MTC UEs. As data TBs associated with MTC UEs are typically substantially smaller than the ones associated with conventional UEs, applying same DL or UL control or data multiplexing mechanisms for MTC UEs as for conventional UEs will cause resource utilization for MTC UEs to be substantially worse than the resource utilization for conventional UEs.

Another aspect of supporting communication of MTC UEs is applying a set of functionalities associated with signal transmissions to or from MTC UEs. If signal transmissions for MTC UEs are over a smaller BW than for conventional UEs, different functionalities can be often needed for MTC UEs compared to conventional UEs. Higher power utilization can also be desirable for MTC UEs.

Therefore, there is a need to design control signaling and data or control multiplexing for MTC UEs.

There is also a need to reduce control overhead for MTC UEs.

There is also a need to define, whenever necessary, different functionalities for signal transmissions to or from MTC UEs compared to conventional UEs and to increase power savings for MTC UEs.

SUMMARY OF THE INVENTION

Accordingly, an aspect of the present invention is to address at least the aforementioned limitations and problems and provide at least the advantages described below. An aspect of the present invention provides methods and apparatus for a UE with reduced capabilities (MTC UE) to transmit and receive signaling and to conserve power in a network that also supports conventional UEs.

According to an aspect of the present invention, a method for receiving, by a network, a channel quality indicator from at least one of a first User Equipment (UE) from a first class of UEs and a second UE from a second class of UEs is provided. The method includes transmitting, by the first UE using a first total number of binary elements, a first channel quality indicator having a value from a first set of values; transmitting, by the second UE using a second total number of binary elements, a second channel quality indicator having a value from a second set of values, wherein the second set of values is a subset of the first set of values, and wherein second total number of binary elements is less than the first total number of binary elements; and receiving, by the network, the first channel quality indicator and the second channel quality indicator.

According to another aspect of the present invention, a method for transmitting from a network a Physical Downlink Shared CHannel (PDSCH) to a first User Equipment (UE) from a first class of UEs or to a second UE from a second class of UEs is provided. The method includes transmitting a PDSCH to the first UE using a first bandwidth unit; and transmitting a PDSCH to the second UE using a second bandwidth unit, wherein the second bandwidth unit is smaller than the first bandwidth unit.

According to another aspect of the present invention, a method for receiving at a User Equipment (UE) a Scheduling Assignment (SA) from a network is provided. The method includes receiving, by the UE, a bit-map having a number X of bits, the bit-map transmitted to the UE from the network and its elements have a one-to-one correspondence with X Transmission Time Intervals (TTIs), wherein an element with a first binary value indicates that the network may transmit a SA to the UE in the respective TTI and an element with a second binary value indicates that the network may not transmit a SA to the UE in the respective TTI; decoding, by the UE, candidate SAs in a TTI associated with the first binary value to detect whether the network transmits a SA; and suspending, by the UE, decoding for candidate SAs in a TTI associated with the second binary value.

According to another aspect of the present invention, a User Equipment (UE) apparatus for receiving a Physical Downlink Shared CHannel (PDSCH) is provided. The apparatus includes a receiver for receiving a reference signal over a first bandwidth unit and for receiving a data signal over a second bandwidth unit wherein the second bandwidth resource unit is smaller than the first bandwidth unit; and a demodulator for demodulating the data signal using the reference signal.

According to another aspect of the present invention, User Equipment (UE) apparatus for receiving a Scheduling Assignment (SA) from a network is provided. The apparatus includes a receiver for receiving a bit-map having a number X of bits transmitted from the network, the bit-map elements having a one-to-one correspondence with X Transmission Time Intervals (TTIs), wherein an element with a first binary value indicates that the network may transmit a SA to the UE apparatus in the respective TTI and an element with a second binary value indicates that the network may not transmit a SA to the UE apparatus in the respective TTI; a decoder for decoding candidate SAs in a TTI associated with the first binary value to detect whether the network transmits a SA; and a decoder suspending unit for suspending decoding for candidate SAs in a TTI associated with the second binary value.

According to another aspect of the present invention, a method for receiving by a network a Physical Uplink Shared CHannel (PUSCH) from a first User Equipment (UE) or from a second UE is provided. The method includes receiving a PUSCH from the first UE using a first bandwidth unit; and receiving a PUSCH from the second UE using a second bandwidth unit, wherein the second bandwidth unit is less than the first bandwidth unit.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Figure 1:
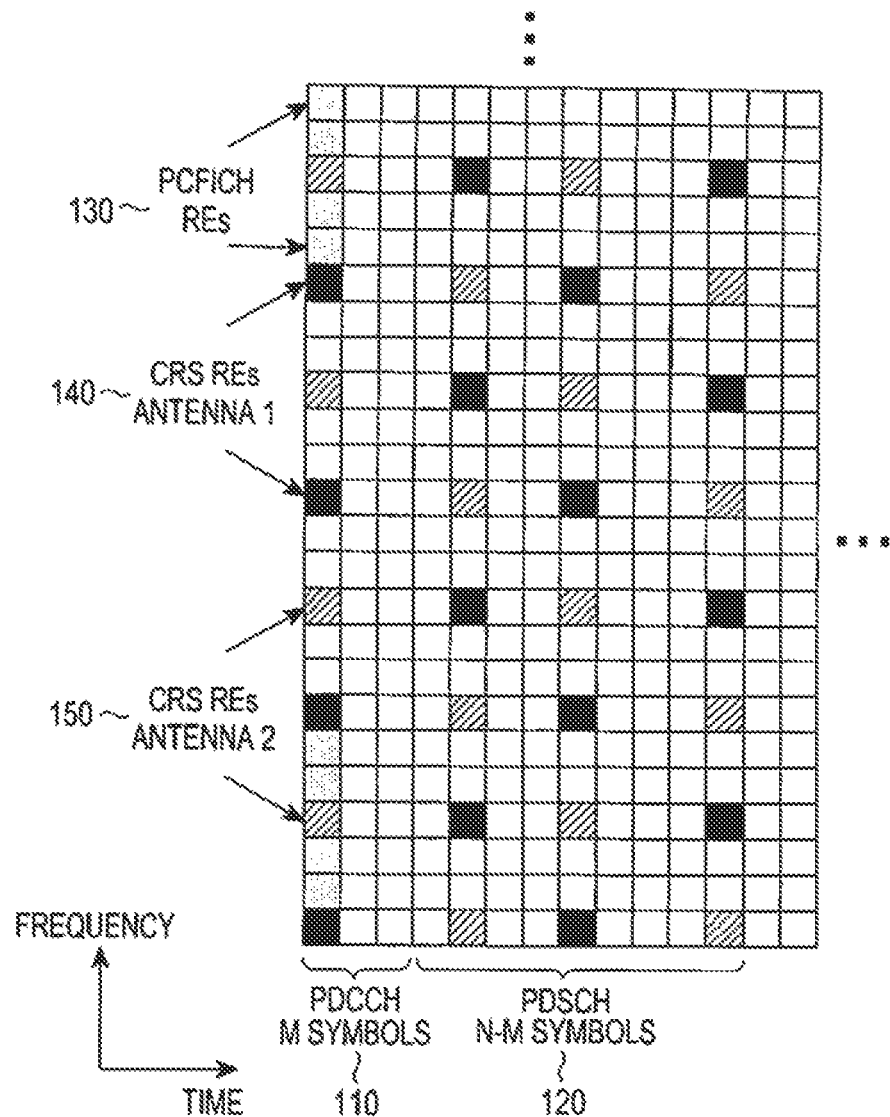
FIG. 1 is a diagram illustrating a conventional structure for PDCCH transmissions in a DL TTI.
Figure 2:
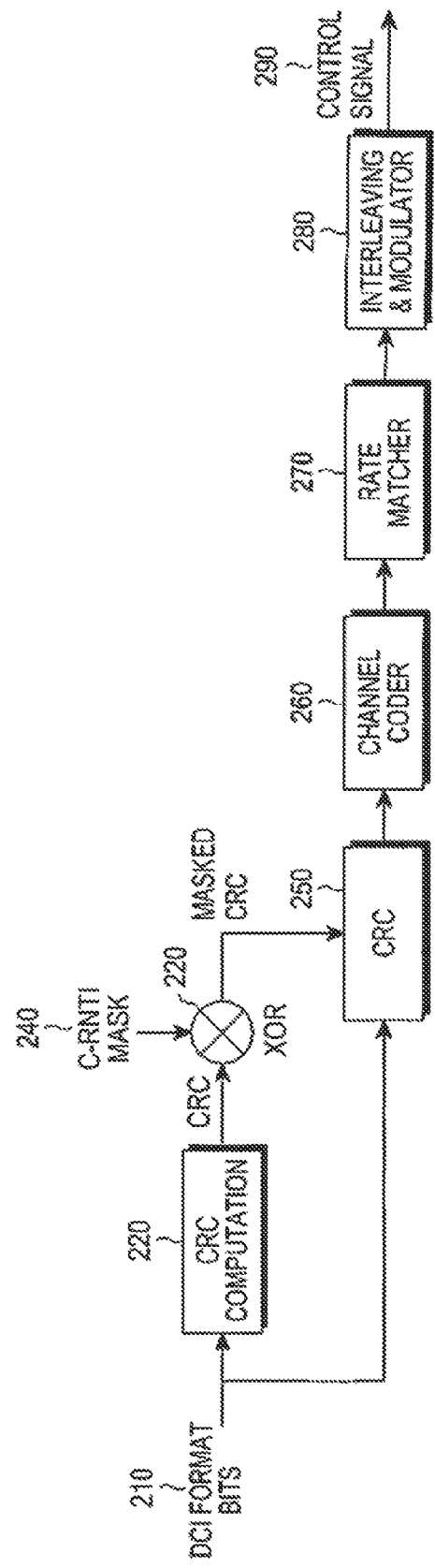
FIG. 2 is a diagram illustrating a conventional encoding and transmission process for a DCI format.
Figure 3:
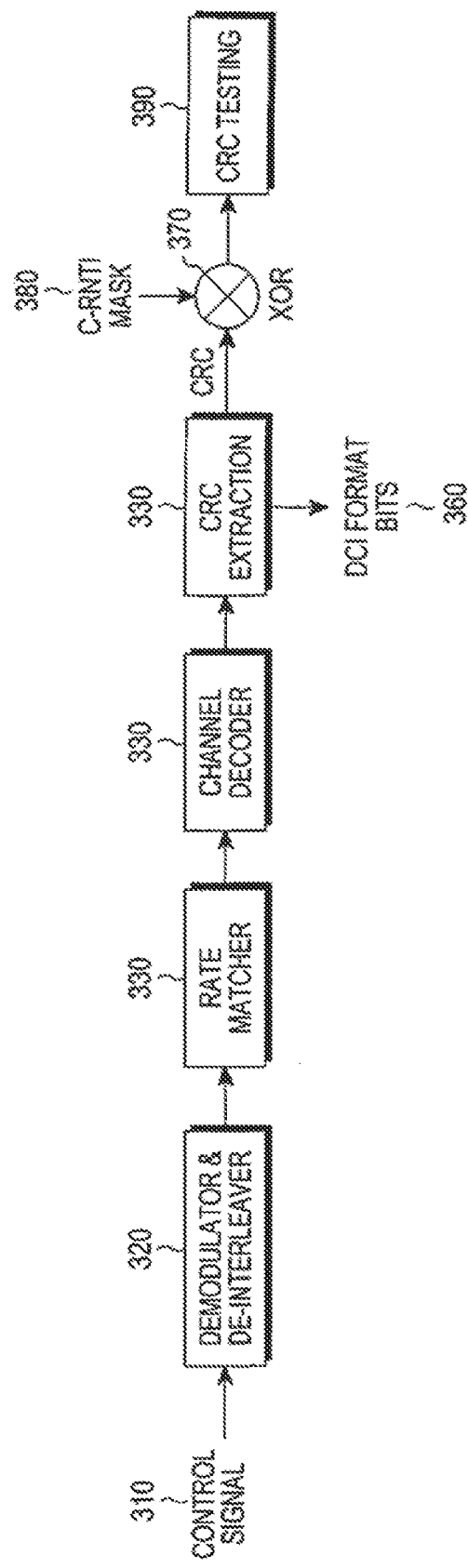
FIG. 3 is a diagram illustrating a conventional reception and decoding process for a DCI format.
Figure 4:
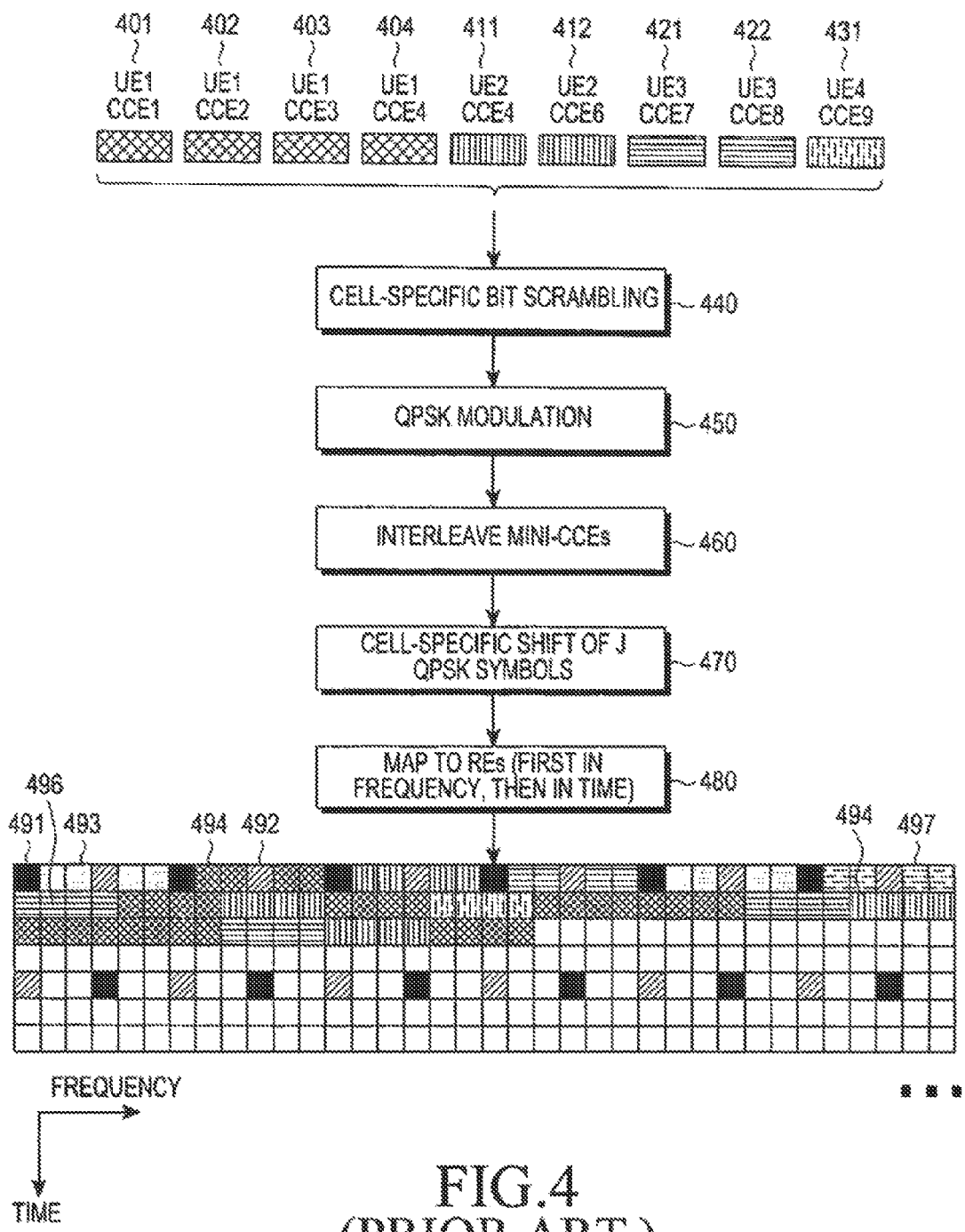
FIG. 4 is a diagram illustrating a conventional transmission process of a DCI format in a respective C-PDCCH.
Figure 5:
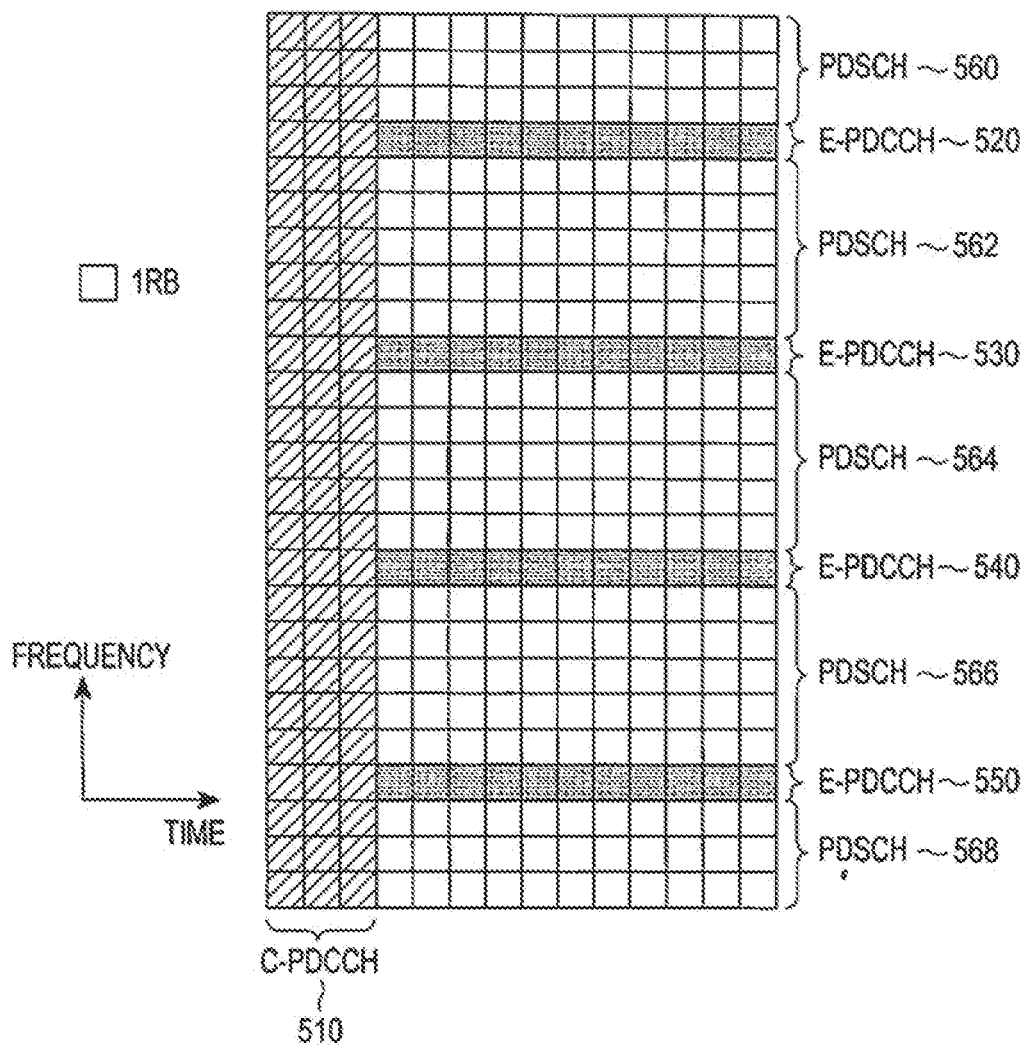
FIG. 5 is a diagram illustrating a conventional E-PDCCH transmission structure.

Various embodiments of the present invention are described hereinafter with reference to the accompanying drawings. Throughout the drawings, the same drawing reference numerals may refer to the same or similar elements, features and structures. In the following description, specific details such as detailed configuration and components are provided to assist the overall understanding of embodiments of the present invention. Therefore, it should be apparent to those skilled in the art that various changes and modifications of the embodiments described herein can be made without departing from the scope and spirit of the invention. In addition, descriptions of well-known functions and constructions may be omitted for clarity and conciseness.

Additionally, although embodiments of the present invention are described herein with reference to Orthogonal Frequency Division Multiplexing (OFDM), embodiments of the present invention are also are applicable to all Frequency Division Multiplexing (FDM) transmissions in general and to Discrete Fourier Transform (DFT)-spread OFDM in particular.

An embodiment of the invention that considers a DL control signaling design for MTC UEs is described as follows.

Higher layer signaling from a NodeB to an MTC UE may indicate that DL signaling (for control or data) to the MTC UE begins at any OFDM symbol between a first OFDM symbol of a DL subframe and an OFDM symbol after a maximum number of OFDM symbols used for transmissions of C-CCHs. In practice, this is equivalent to a NodeB informing an MTC UE of a number of OFDM symbols the MTC UE needs to assume as used for transmissions of C-CCHs (regardless of whether there are transmissions of C-CCHs) to conventional UEs. Due to a reduced DL BW capability, an MTC UE cannot generally correctly decode C-CCHs transmitted over a wider DL BW and intended to conventional UEs, OFDM symbols conveying C-CCHs should be dismissed by MTC UEs. Therefore, DL signaling to MTC UEs may be in a fraction of a DL subframe instead of being distributed over an entire DL subframe as for conventional UEs.

A higher layer signaling indication to an MTC UE of a starting subframe symbol for DL signaling may also be a function of a DL subframe number as certain DL subframes may convey different traffic types (for example, unicast or broadcast) and be associated with a different maximum number of OFDM symbols for transmissions of C-CCHs. For example, in some DL subframes this maximum number of OFDM symbols can be three, while in other subframes there is a maximum of two OFDM symbols. Although a number of OFDM symbols used for transmitting C-CCHs is never zero, this value may still be indicated to MTC UEs. It is up to a network to avoid transmitting any C-CCHs to conventional UEs that do not need to be aware of this event. However, an MTC UE may need to exclude CRS REs from REs conveying DL signaling (control or data) as, unlike C-CCH REs, a NodeB cannot replace signaling of CRS with DL signaling to MTC UEs. An alternative to higher layer signaling is for MTC UEs to assume a maximum number of OFDM symbols for transmitting C-CCHs. However, in many cases, this assumption can be wasteful as transmissions of C-CCHs may require less than a maximum number of OFDM symbols.

Figure 10:
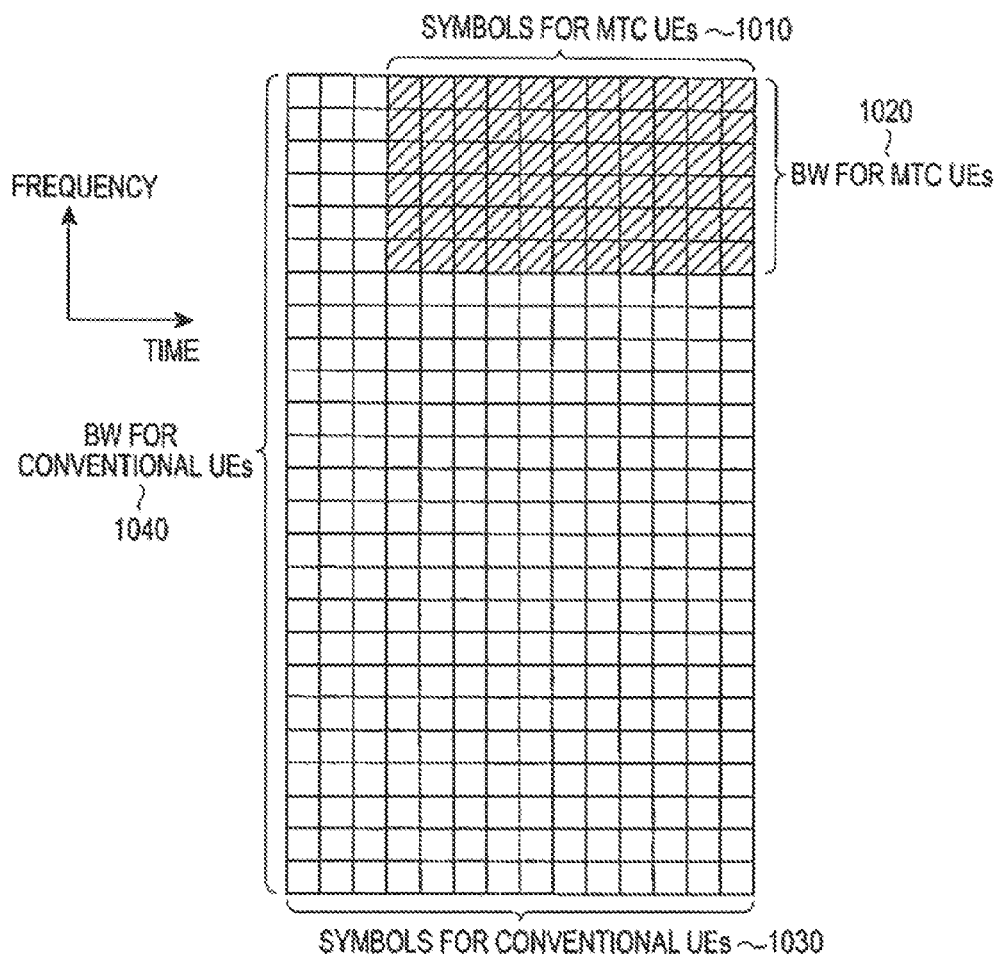
FIG. 10 is a diagram illustrating a general principle of DL signaling to an MTC UE according to an embodiment of the present invention.

FIG. 10 is a diagram illustrating a general principle of DL signaling to an MTC UE according to an embodiment of the present invention.

Referring to FIG. 10, an MTC UE is informed, through higher layer signaling, of OFDM symbols available for DL signaling 1010 at a given subframe (or the MTC UE may assume a maximum number of OFDM symbols for transmissions of C-CCHs). OFDM symbols available for DL signaling to the MTC UE may or may not include all DL subframe symbols. The MTC UE is also informed, through higher layer signaling, of a DL BW part allocated for DL signaling 1020. Different MTC UEs may be informed of different parts of a DL BW, but all MTC UEs are informed of the same OFDM symbols for DL signaling. Therefore, higher layer signaling indicating OFDM symbols for DL signaling may be common to all MTC UEs while higher layer signaling indicating a DL BW for DL signaling may be specific to each MTC UE. Conventional UEs have all DL subframe symbols 1030 available and potentially also have all DL BW (if there are no DL transmissions to MTC UEs) 1040 available, and the conventional UEs do not need be aware of a presence of MTC UEs.

After an MTC UE is informed of a number of OFDM symbols and of a DL BW part for DL signaling, physical structures for transmissions of control channels and data channels need to be defined. A PDSCH transmission to an MTC UE can be the same as for a conventional UE and can occur over a maximum number of PRBs corresponding to an allocated DL BW part and to a number of available OFDM symbols.

In a first approach, DL control signaling support for an MTC UE is provided through CCHs having the same structure as C-CCHs but which, unlike C-CCHs, are transmitted only in a DL BW allocated to the MTC UE instead of being transmitted over substantially the entire DL BW.

Figure 11:
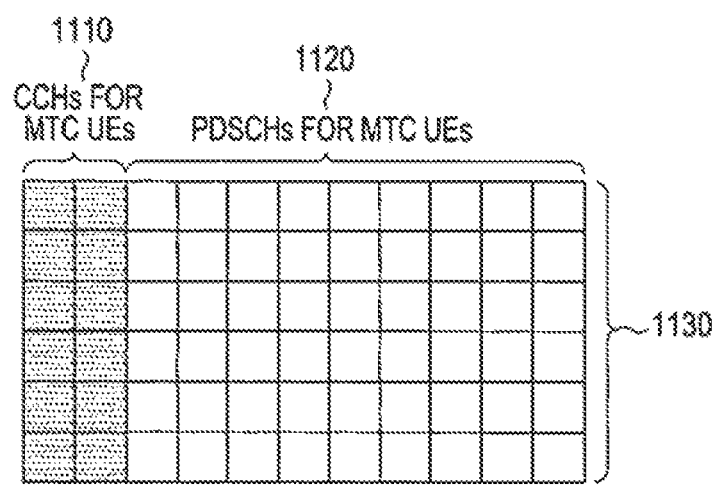
FIG. 11 is a diagram illustrating a multiplexing of CCHs, having a same structure as C-CCHs, and PDSCHs for MTC UEs in OFDM symbols of a DL subframe according to an embodiment of the present invention.

FIG. 11 is a diagram illustrating a multiplexing of CCHs, having a same structure as C-CCHs, and PDSCHs for MTC UEs in OFDM symbols of a DL subframe according to an embodiment of the present invention.

Referring to FIG. 11, a first two OFDM symbols available for DL signaling to an MTC UE, as described in FIG. 10, are used for transmissions of CCHs 1110. Remaining OFDM symbols of a DL subframe are used for transmissions of PDSCHs 1120. Transmissions of CCHs to the MTC UE span an entire DL BW 1130 allocated to the MTC UE.

A duration for transmitting CCHs to an MTC UE may be configured by higher layer signaling and, unlike a configuration for conventional UEs, a respective PCFICH transmission in every subframe may be avoided. This is because due to a typically small DL BW, savings from dynamically dimensioning in every subframe CCH resources for MTC UEs are largely offset by the resource overhead required for reliable PCFICH detection by all MTC UEs in a same allocated DL BW.

Depending on a NodeB scheduler decision, PDSCH transmissions to MTC UEs may span or may not span all DL BW allocated to MTC UEs. However, in the latter case, DL BW not used for PDSCH transmissions to MTC UEs cannot be used in practice for PDSCH transmissions to conventional UEs as some OFDM symbols always contain CCH transmissions to MTC UEs. For example, it is likely in practice that most CCHs for MTC UEs schedule PUSCH transmissions and most of the DL BW after transmissions of CCHs to MTC UEs remain unutilized.

In a second approach according to an embodiment of the present invention that avoids the above shortcoming associated with using the structure of C-CCHs for transmitting CCHs to MTC UEs, the structure of E-CCHs is used for transmitting CCHs to MTC UEs. Although E-CCHs may also be used for conventional UEs, a different design is needed for MTC UEs due to aforementioned RF and DBB limitations.

Figure 12:
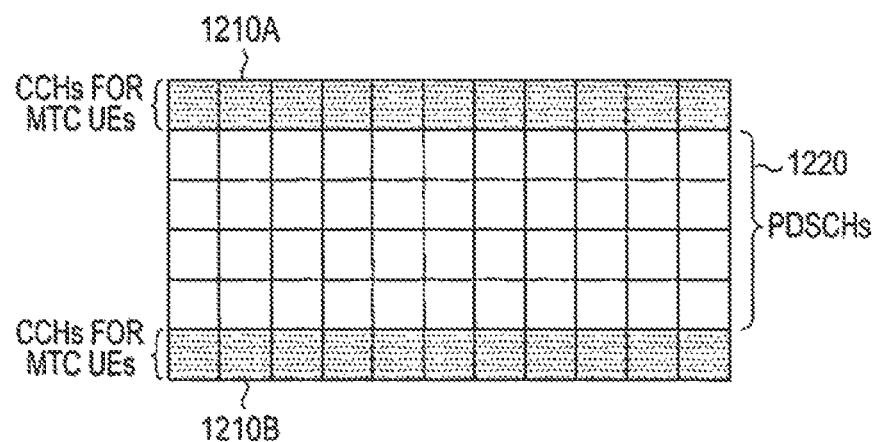
FIG. 12 is a diagram illustrating a multiplexing of E-CCHs and PDSCHs for MTC UEs according to an embodiment of the present invention.

FIG. 12 is a diagram illustrating a multiplexing of E-CCHs and PDSCHs for MTC UEs according to an embodiment of the present invention.

Referring to FIG. 12, E-CCHs are transmitted to MTC UEs over all respective OFDM symbols available for DL transmissions, as described in FIG. 10, and over two PRBs 1210A and 1210B (of a DL BW part allocated to MTC UEs) that are provided to respective MTC UEs through higher layer signaling. Remaining PRBs can be used for PDSCH transmissions 1220 either to MTC UEs or to conventional UEs.

Figure 6:
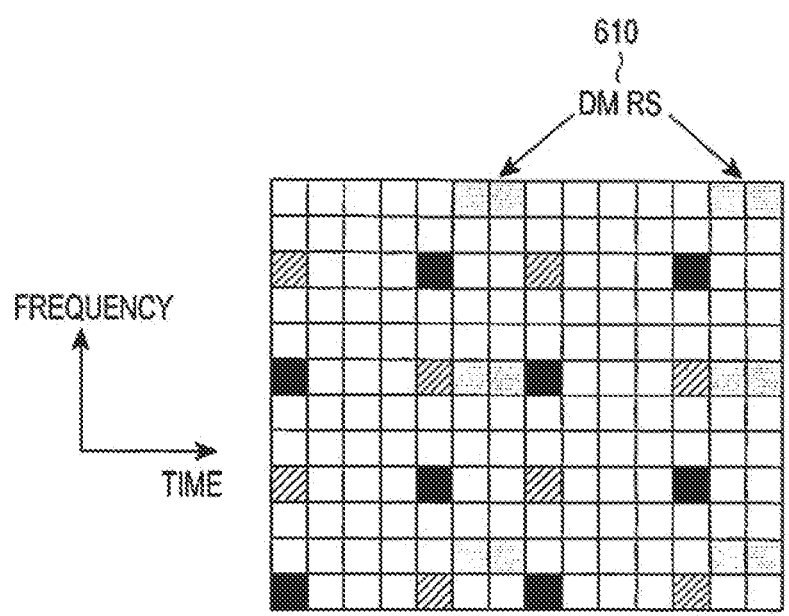
FIG. 6 is a diagram illustrating a conventional DMRS structure.
Figure 7:
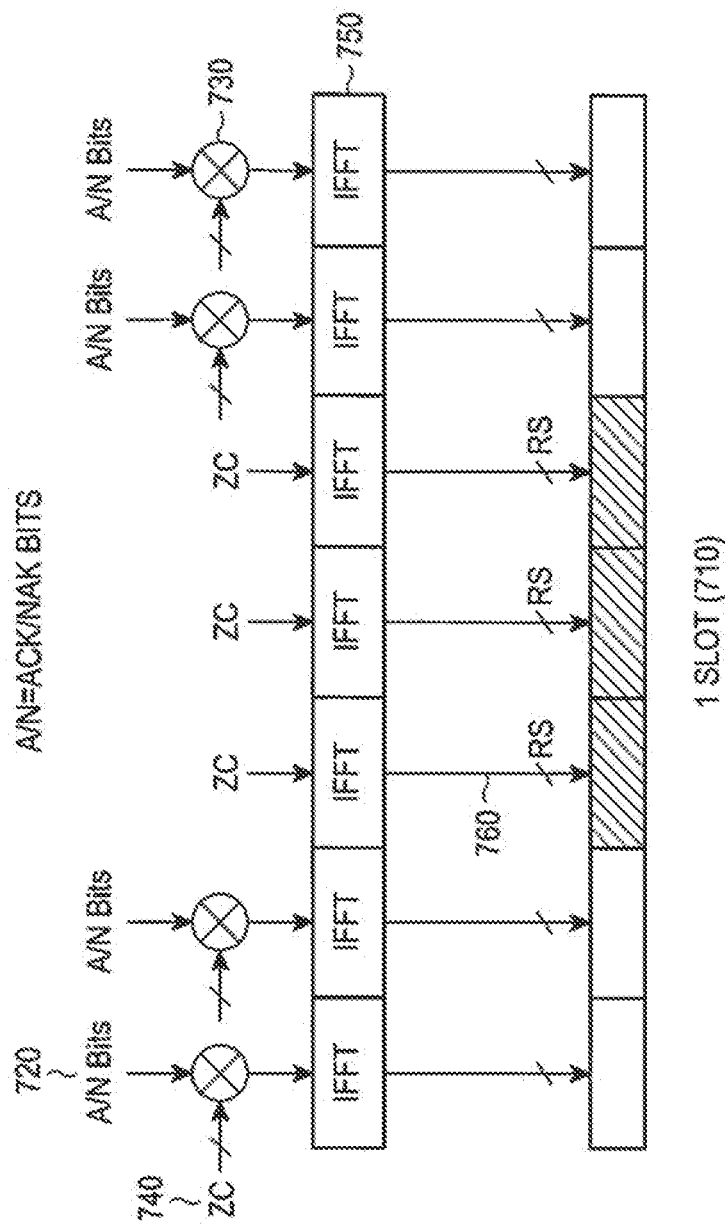
FIG. 7 is a diagram illustrating a conventional structure for a HARQ-ACK signal transmission in one of the two subframe slots of a PUCCH.
Figure 8:
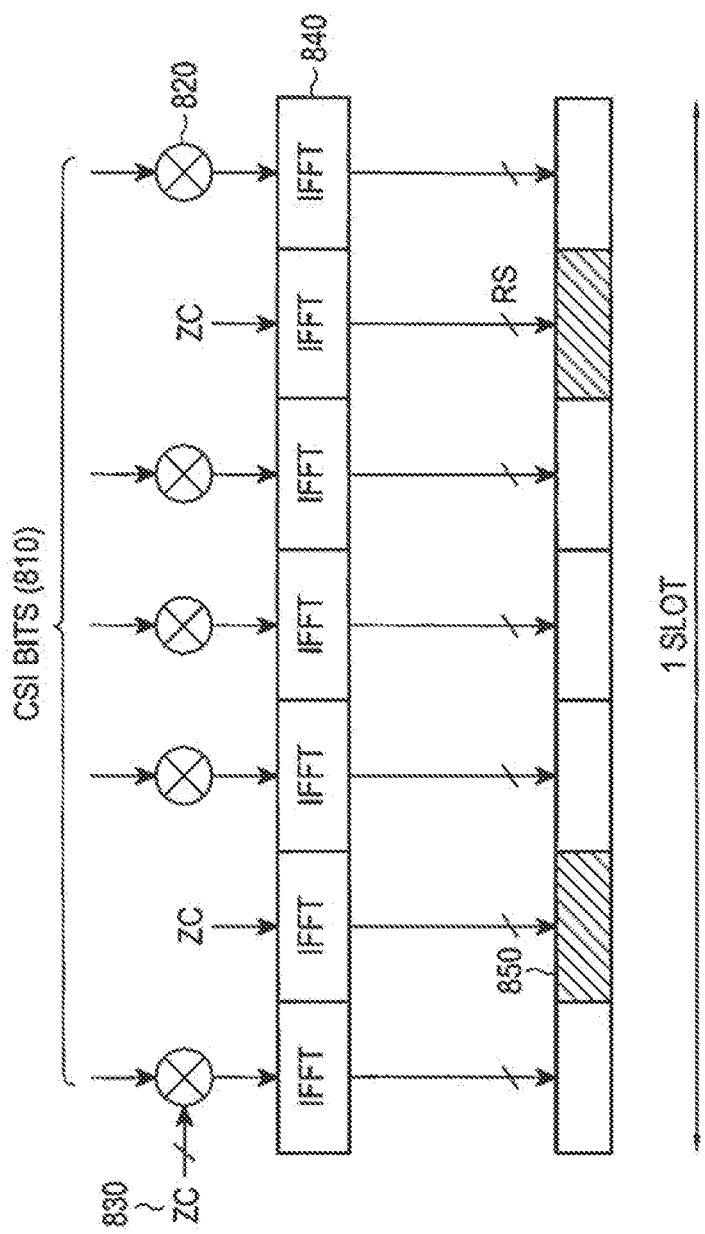
FIG. 8 is a diagram illustrating a conventional structure for periodic CSI signal transmission in one of the two subframe slots of a PUCCH.
Figure 9:
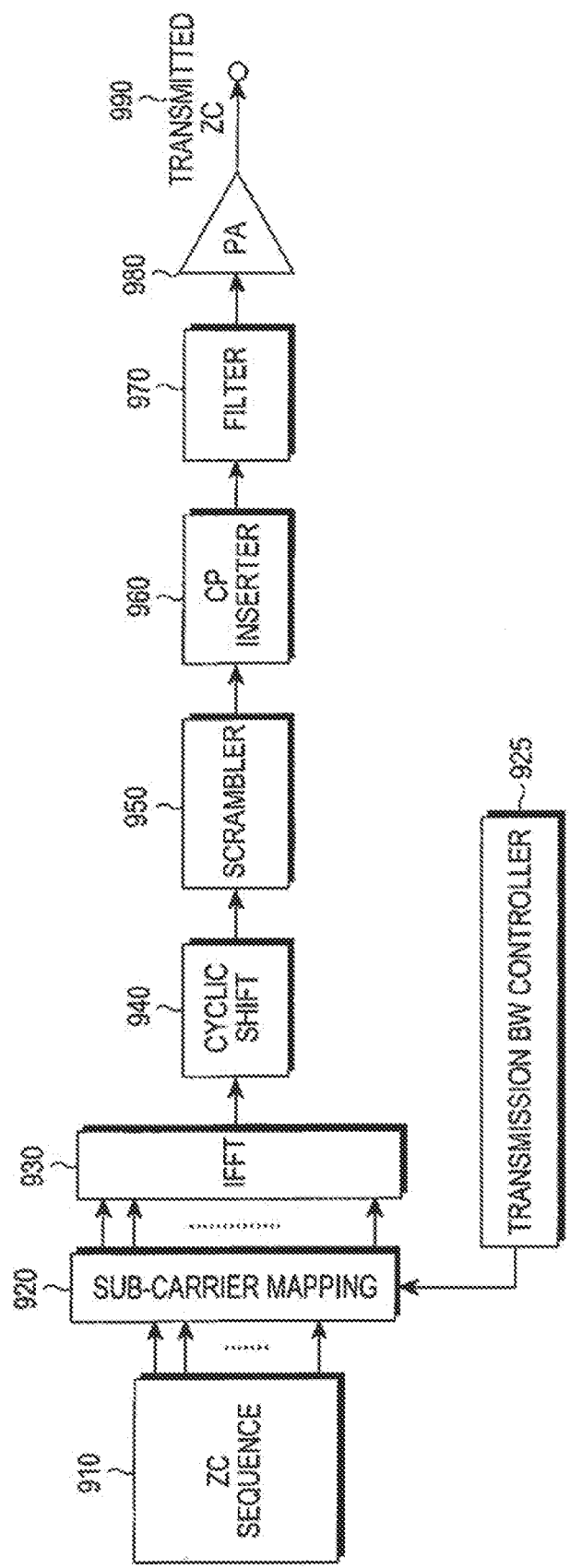
FIG. 9 is a diagram illustrating a conventional transmitter for a ZC sequence, which, without modulation, serves as an RS and with modulation serves as a HARQ-ACK signal or as a CSI signal.

As a PRB granularity may be too large for PDSCH transmissions to MTC UEs, which typically convey small data packets or configuration control information by higher layer signaling, a smaller granularity may be used for transmitting E-CCHs or PDSCHs to MTC UEs. For example, a minimum resource allocation unit can be half a PRB or equivalently a second PRB type, which includes half the REs of a conventional PRB, can be used. The DMRS associated with each channel (E-CCH or PDSCH) can be transmitted over the whole PRB, such as illustrated in FIG. 6. Multiplexing PDSCHs to different MTC UEs in one PRB can also be performed in the same manner. In this case, a UE may determine which half of a PRB a respective PDSCH is transmitted, either by configuration from the network, or by explicit indication by one bit in a DL SA, or by implicit indication (for example, depending on whether the UE is configured an odd or even RNTI). The DMRS antenna port associated with a respective MTC UE may be predetermined as configured to the MTC UE by higher layer signaling or included in a field of a DCI format scheduling the PDSCH reception.

Figure 13:
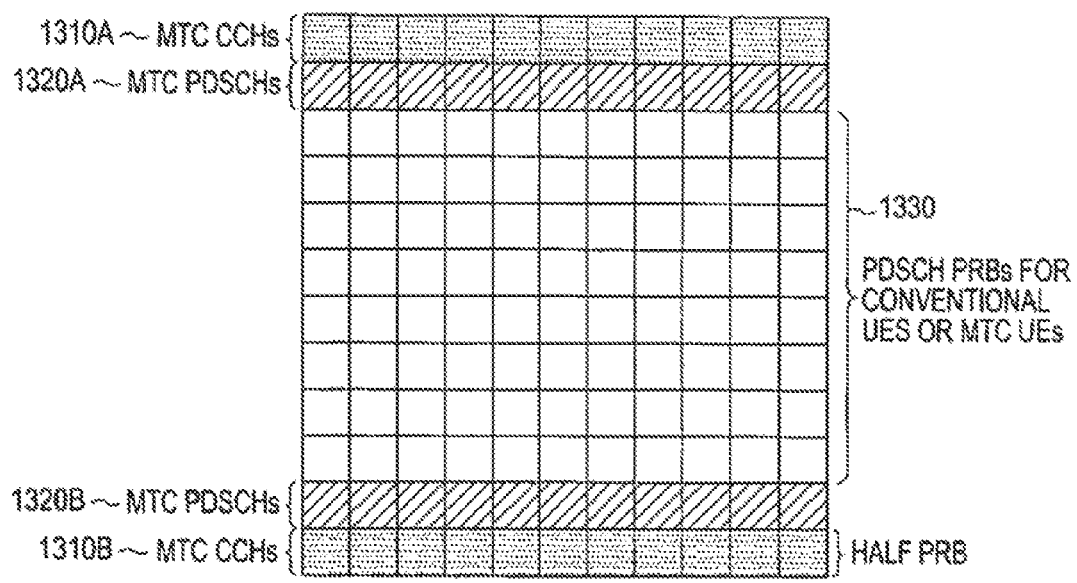
FIG. 13 is a diagram illustrating a multiplexing of PDSCHs and E-CCHs using a granularity of a half PRB according to an embodiment of the present invention.

FIG. 13 is a diagram illustrating a multiplexing of PDSCHs and E-CCHs using a granularity of a half PRB according to an embodiment of the present invention.

Referring to FIG. 13, E-CCHs (or PDSCHs) are transmitted in two half PRBs located at the two edges of a DL BW allocated to MTC UEs 1310A and 1310B. The other half of each of the 2 PRBs containing transmissions of E-CCHs is allocated to PDSCH transmissions to MTC UEs 1320A and 1320B. Remaining PRBs 1330 may be allocated for PDSCH transmissions to MTC UEs or to conventional UEs. As typically more UL data traffic than DL data traffic is associated with MTC UEs, resources allocated to transmissions of E-CCHs to MTC UEs may be similar to or more than resources allocated to transmissions of PDSCHs to MTC UEs.

Multiplexing PUSCHs from different MTC UEs in one PRB can also be performed in a similar manner as for PDSCHs and the associated UL DMRS can be transmitted in one PRB. The UL DMRS from different MTC UEs can be orthogonally multiplexed using different CS of a respective ZC sequence which may be predetermined as configured to the MTC UE by higher layer signaling or included in a field of a DCI format scheduling the PUSCH transmission.

Due to their reduced DBB capabilities, MTC UEs may not support both distributed E-CCHs and localized E-CCHs while conventional UEs may support both E-CCH transmission types. A transmission type for an E-CCH can be same as for a PDSCH and may depend on a RF capability of an MTC UE. If a DL BW supported by an MTC UE is small enough for transmissions of DL signals to not experience significant frequency selectivity, a detection performance difference between a localized E-CCH and a distributed E-CCH will not be significant, as a channel response experienced by a respective transmission will be similar. Distributed transmissions for both E-CCHs and PDSCH may offer interference diversity while leveraging on existing NodeB and UE implementations using transmitter antenna diversity.

Conversely, if a DL BW supported by an MTC UE is large enough for transmissions of DL signals to experience significant frequency selectivity, a detection performance difference between localized E-CCHs and distributed E-CCHs can be significant and depend on an availability of accurate, PRB-based, CSI at a NodeB. Then, localized PDSCH and E-CCH can be precoded and the NodeB can select PRBs where an MTC UE experiences large DL SINR. Considering an UL control overhead required for a CSI feedback to track channel variations and provide sufficient accuracy for beam-forming or Frequency Domain Scheduling (FDS) of PDSCH or E-CCH transmissions, localized PDSCH and E-CCH transmissions may be practically feasible only for MTC UEs with very limited or no mobility for which infrequent CSI feedback suffices. Otherwise, if accurate PRB-based CSI for an MTC UE is not available at a NodeB, distributed transmissions may substantially outperform localized transmissions.

When an E-CCH transmission to an MTC UE is distributed over multiple PRBs, two alternatives for a respective RS structure for demodulating a control signal in the E-CCH are described as follows.

A first alternative uses a CRS structure as shown in FIG. 1. However, unlike the CRS structure in FIG. 1, which is wideband and substantially occupies an entire DL BW, a CRS used by an MTC UE may be contained only in a DL BW allocated to the MTC UE and may not extend in a remaining DL BW. Therefore, a CRS may be commonly used by MTC UEs but may not be used by conventional UEs.

Figure 14:
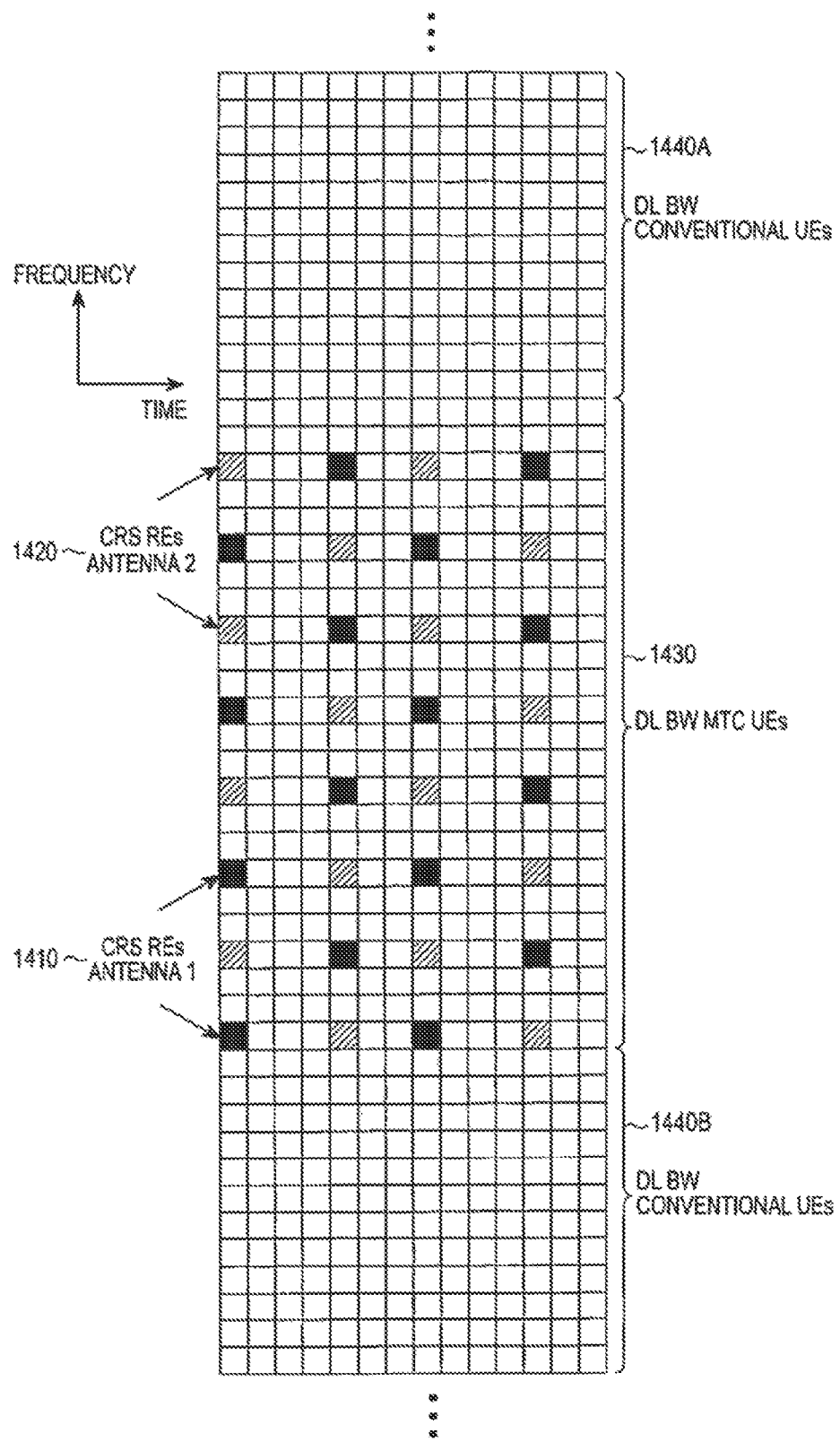
FIG. 14 is a diagram illustrating a CRS transmission only in a DL BW allocated to an MTC UE according to an embodiment of the present invention.

FIG. 14 is a diagram illustrating a CRS transmission only in a DL BW allocated to an MTC UE according to an embodiment of the present invention.

Referring to FIG. 14, which depicts an example corresponding to two NodeB transmitter antenna ports, a CRS from a first antenna port 1410 and a CRS from a second antenna port 1420 are transmitted in REs of a DL BW allocated to MTC UEs 1430 in same OFDM symbols as in FIG. 1. CRS transmissions may or may not occur in REs of a DL BW allocated to conventional UEs 1440A and 1440B.

If a PRB in a DL BW allocated to MTC UEs is not used for E-CCH or PDSCH transmissions to MTC UEs, the PRB may be allocated to a PDSCH transmission to a conventional UE. Then, if CRS is transmitted in REs of that PRB and if in respective OFDM symbols there are no CRS transmissions in a DL BW allocated to conventional UEs, a conventional UE may not be aware of an existence of CRS and its PDSCH detection will be degraded. This degradation can be avoided if MTC UEs assume presence of CRS only in the PRB of a respective E-CCH or PDSCH transmission but this will instead result to worse channel estimation for MTC UEs and associated E-CCH or PDSCH performance degradation.

A second alternative uses a DMRS, which is transmitted only in PRBs used by a respective E-CCH or PDSCH transmission. This avoids the above tradeoff from using a CRS and allows flexible use of PRBs in a DL BW allocated to MTC UEs for transmissions to conventional UEs. To achieve transmit diversity, different precoding in different REs or different PRBs may be used for the DMRS. However, prior to establishing communication with a NodeB, MTC UEs must detect a BCH, which may be transmitted by a NodeB using antenna transmitter diversity and received by MTC UEs based on CRS, MTC UEs should be able to perform channel estimation and demodulation based on both CRS and DMRS. Therefore, a tradeoff for the RS structure used between the first alternative (CRS) and the second alternative (DMRS) is a receiver implementation simplicity offered by the former versus a more efficient DL resource utilization offered by the latter.

Another embodiment of the invention that considers reductions in control signaling overhead for MTC UEs is described as follows.

As sizes of data packets for MTC UEs are typically substantially smaller than sizes of data packets for conventional UEs, and as a number of MTC UEs with PDSCH or PUSCH scheduling in a DL subframe may be greater than a respective number of conventional UEs, a relative control signaling overhead associated with MTC UEs may become significant. For example, although a DCI format scheduling PDSCH or PUSCH to an MTC UE may address a much smaller BW than a DCI format scheduling PDSCH or PUSCH to a conventional UE, a reduction in a DCI format size may not be proportional to a reduction in a BW size due to an existence of fields with fixed size such as the RNTI/CRC field. Also, it is not possible to reduce resources for transmitting HARQ-ACK signals conveying single binary information (ACK or NACK) regarding a reception of a data TB.

Therefore, if the same design principles as for conventional UEs are followed for MTC UEs, a control information size relative to a data information size can become significantly larger for MTC UEs than for conventional UEs leading to a proportionally much larger relative control overhead for MTC UEs. A control signaling overhead for MTC UEs may further increase if respective transmissions are constrained to be over a smaller BW than the BWs for conventional UEs. This constraint reduces frequency diversity or frequency scheduling gains thereby necessitating a use of more resources (time/frequency/power) in order to maintain same detection reliability targets.

A reduction or avoidance of control signaling overhead associated with HARQ-ACK signal transmissions either from a NodeB or from an MTC UE in response to, respectively, detections of data TBs in a PUSCH or a PDSCH is subsequently considered.

For a dynamically scheduled PUSCH, assuming than an MTC UE keeps received data for a HARQ process in its buffer until a respective NDI bit is toggled, an NDI field in a corresponding DCI format avoids a need for explicit HARQ-ACK signaling. For semi-persistently scheduled (SPS) PUSCH, associated applications are typically related to file transfers, which are delay tolerant. Then, a higher layer ARQ, such as a Radio Link Control (RLC) ARQ, is sufficient to trigger a retransmission whenever a PUSCH is not correctly received. A network may also avoid a latency associated with higher layer ARQ by dynamically scheduling a PUSCH retransmission, for example, when an overhead for transmitting an associated DCI format is not a concern, such as during off-peak hours, for example. Therefore, the NDI field can be preserved in DCI formats scheduling PUSCH to provide HARQ-ACK information and explicit HARQ-ACK signaling to MTC UEs through respective PHICHs may not be supported.

PDSCH transmissions to MTC UEs are typically used for configuration of transmission parameters and to provide respective control information by higher layers. Therefore, PDSCH transmissions are not as frequent as PUSCH transmissions from MTC UEs and do not consume as many resources. Such transmissions enable a network to target a more reliable PDSCH than PUSCH reception. A network may also derive whether a PDSCH was correctly or incorrectly received by monitoring a response from an MTC UE to the configuration information. For example, if a PDSCH configures an SRS transmission from an MTC UE, a network may detect a presence or absence of an SRS transmission with configured parameters and determine that the MTC UE correctly or incorrectly, respectively, received the PDSCH. Additionally, if a network schedules both a PDSCH and a PUSCH to an MTC UE in a same subframe, as can be expected in practice due to UE dominant traffic for MTC UEs, the MTC UE can include HARQ-ACK information for the PDSCH reception in the PUSCH transmission. Therefore, in addition to higher layer ARQ, sufficient means exist for a NodeB to obtain information of whether an MTC UE correctly or incorrectly received a PDSCH and therefore separate transmission of a HARQ-ACK signal from an MTC UE is not needed. This also avoids the need to include TPC commands for HARQ-ACK signal transmission in a PUCCH in DCI formats scheduling PDSCH.

Therefore, embodiments of present the invention consider that physical layer retransmissions for an HARQ process are supported for MTC UEs but only through a use of a NDI field when using a PUSCH transmission or by including HARQ-ACK information in a PUSCH when using a PDSCH transmission and the respective DCI formats are accordingly designed. Benefits from avoiding explicit support of HARQ-ACK signal transmissions in response to a PDSCH or to a PUSCH detection include an associated control signaling overhead reduction, avoidance of resource fragmentation, a simpler system design, and a reduced DBB design complexity for MTC UEs.

Another embodiment of the invention that considers the design of different functionalities for signal transmissions to or from MTC UEs compared to conventional UEs is described as follows.

A first functionality that needs to be modified for MTC UEs compared to conventional UEs is CSI reporting. Conventional UEs compute a wideband CQI based on an unrestricted observation interval in time and frequency and derive for each CQI value a CQI index between 1 and 15 for which a single PDSCH TB with a combination of modulation scheme and TB size corresponding to the CQI index, and occupying a group of DL PRBs could be received with a TB error probability not exceeding 0.1. If this is not possible, a CQI index of 0 is reported by the conventional UE. An interpretation of the CQI indices is given in Table 1.

TABLE 1

4-bit CQI Table

| CQI Bits | CQI index | Modulation | code rate x 1024 | efficiency |
| --- | --- | --- | --- | --- |
| 0000 | 0 | | out of range | |
| 0001 | 1 | QPSK | 78 | 0.1523 |
| 0010 | 2 | QPSK | 120 | 0.2344 |
| 0011 | 3 | QPSK | 193 | 0.3770 |
| 0100 | 4 | QPSK | 308 | 0.6016 |
| 0101 | 5 | QPSK | 449 | 0.8770 |
| 0110 | 6 | QPSK | 602 | 1.1758 |
| 0111 | 7 | 16QAM | 378 | 1.4766 |
| 1000 | 8 | 16QAM | 490 | 1.9141 |
| 1001 | 9 | 16QAM | 616 | 2.4063 |
| 1010 | 10 | 64QAM | 466 | 2.7305 |
| 1011 | 11 | 64QAM | 567 | 3.3223 |
| 1100 | 12 | 64QAM | 666 | 3.9023 |
| 1101 | 13 | 64QAM | 772 | 4.5234 |
| 1110 | 14 | 64QAM | 873 | 5.1152 |
| 1111 | 15 | 64QAM | 948 | 5.5547 |

As MTC UEs need to have reduced DBB cost and capabilities, MTC UEs may support only QPSK modulation for data transmitted in a PDSCH TB. Therefore, only the first 7 CQI indices in Table 1 are applicable to wideband CQI reporting from MTC UEs. Alternatively, a larger granularity for a spectral efficiency may be supported and only 8 of the 16 values in Table 1 may be indicated. Then, a respective 3-bit CQI table is given in Table 2 (assuming use of only QPSK modulation—a similar table can be constructed if only every other efficiency from Table 1 is reported). Moreover, as MTC UEs receive PDSCH only in an allocated DL BW, which can be less than a total DL BW available to conventional UEs, CQI reporting for MTC UEs should be restricted in frequency only in the allocated DL BW.

TABLE 2

3-bit CQI Table

| CQI Bits | CQI index | Modulation | code rate x 1024 | efficiency |
| --- | --- | --- | --- | --- |
| 000 | 0 | | out of range | |
| 001 | 1 | QPSK | 78 | 0.1523 |
| 010 | 2 | QPSK | 120 | 0.2344 |
| 011 | 3 | QPSK | 193 | 0.3770 |
| 100 | 4 | QPSK | 308 | 0.6016 |
| 101 | 5 | QPSK | 449 | 0.8770 |
| 110 | 6 | QPSK | 602 | 1.1758 |
| 111 | 7 | QPSK | reserved | reserved |

Additional differences in CQI reporting functionalities between conventional UEs and MTC UEs can include reporting support of sub-band CQI, PMI, and RI. As a conventional UE can receive PDSCH at any part of a total DL BW, CQI reporting corresponding to sub-bands of the total DL BW may be configured in order to enable FDS. Conversely, because MTC UEs can receive PDSCH only in a small DL BW, support of sub-band CQI is not needed.

A conventional UE may also support PDSCH spatial multiplexing and reception of large data TBs and report a support of a PDSCH transmission rank larger than one if it experiences favorable DL channel conditions. Conversely, as, according to the present embodiment of the present invention, MTC UEs do not support PDSCH spatial multiplexing and received data TBs are typically small, there is no need for a PDSCH transmission rank reporting from MTC UEs.

For CRS-based PDSCH and CCH demodulation at MTC UEs, respective transmissions are not precoded and, therefore, there is no need for MTC UEs to report PMI.

For DMRS-based PDSCH and CCH demodulation at an MTC UE and an FDD system, respective transmissions may be precoded and the MTC UE may report a PMI to enable non-random precoding of a signal from a NodeB. For DMRS-based PDSCH and CCH demodulation at an MTC UE and a TDD system, respective transmissions may be precoded but, due to the reciprocity of the DL and UL channels, an MTC UE does not need to report a PMI to enable precoding of a signal from a NodeB since this information is obtained by the NodeB through a DMRS or SRS transmission by the MTC UE.

When an MTC UE reports only a wideband CQI of 3 bits, a required SINR to achieve a target detection reliability is significantly decreased compared to a respective one for a CSI of 4-11 bits that may include wideband CQI, sub-band CQI, and PMI. This SINR reduction can be exploited to reduce an associated PUCCH overhead by increasing a multiplexing capacity of MTC UEs per PRB.

One approach to increase (double) a multiplexing capacity of periodic CQI transmissions for MTC UEs is to allow transmission of periodic CQI over one slot instead of over one subframe. A duration of a periodic CQI transmission (slot or subframe) can be configured to an MTC UE by a NodeB through higher layer signaling (in addition to parameters such as a PUCCH RB, the CS for a ZC sequence, a transmission period, etc.). MTC UEs that are not UL-coverage-limited can be configured to transmit in one slot of a PUCCH subframe. A performance degradation compared to a conventional periodic CSI structure will include a 3 decibel (dB) loss, due to reducing a transmission time interval by a factor of 2, and a frequency diversity loss due to limiting a transmission in same frequency resources. However, a 3 dB loss can be tolerable, due to a smaller periodic CQI information payload for MTC UEs compared to conventional UEs (3 bits instead of 4-to-11 bits), while a frequency diversity loss will typically be small, if a smaller UL BW is allocated to MTC UEs, and will be further reduced due to receiver antenna diversity that typically exists at a NodeB.

Figure 15:
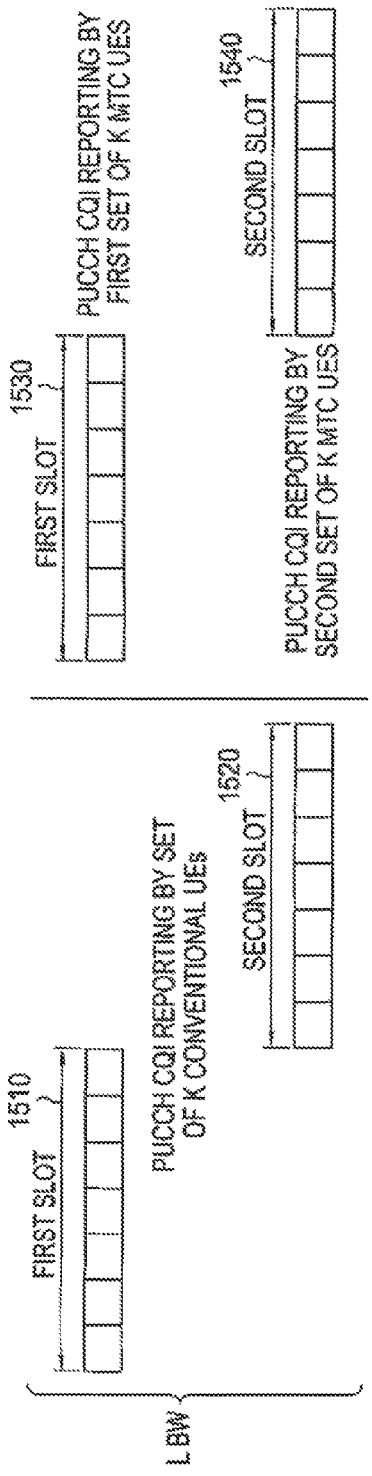
FIG. 15 is a diagram illustrating a first approach to increase a multiplexing capacity of periodic CQI transmissions from MTC UEs according to an embodiment of the present invention.

FIG. 15 is a diagram illustrating a first approach to increase a multiplexing capacity of periodic CQI transmissions from MTC UEs according to an embodiment of the present invention.

Referring to FIG. 15 and for PUCCH transmissions over one RB, a set of K conventional UEs transmit periodic CQI reports by multiplexing their transmissions in a first slot 1510 and in a second slot 1520 of a PUCCH subframe using respectively K different CS of a ZC sequence. A first set of K MTC UEs transmit periodic CQI reports by multiplexing their transmissions in a first slot 1530 of a PUCCH subframe using respectively K different CS of a ZC sequence and a second set of K MTC UEs transmit periodic CQI reports by multiplexing their transmissions in a second slot 1540 of a PUCCH subframe using respectively K different CS of a ZC sequence. Therefore, a multiplexing capacity for MTC UEs is twice the multiplexing capacity of conventional UEs.

Another approach to increase (double) a multiplexing capacity of periodic CQI transmissions for MTC UEs is to restrict such transmissions to a half RB, instead of one RB for conventional UEs, and use ZC sequences of a half-length compared to ZC sequences used by conventional UEs. For example, for a RB including REs, two ZC sequences of length 6 (which can be the same), can be used for transmitting periodic CQI by MTC UEs in two half RBs while ZC sequences used for transmitting periodic CQI by conventional UEs are of length 12 and periodic CQI transmission is in one RB. Through this allocation, frequency diversity loss is avoided, and only an SINR loss of 3 dB exists for periodic CQI transmissions from MTC UEs compared to SINR losses from conventional UEs.

Figure 16:
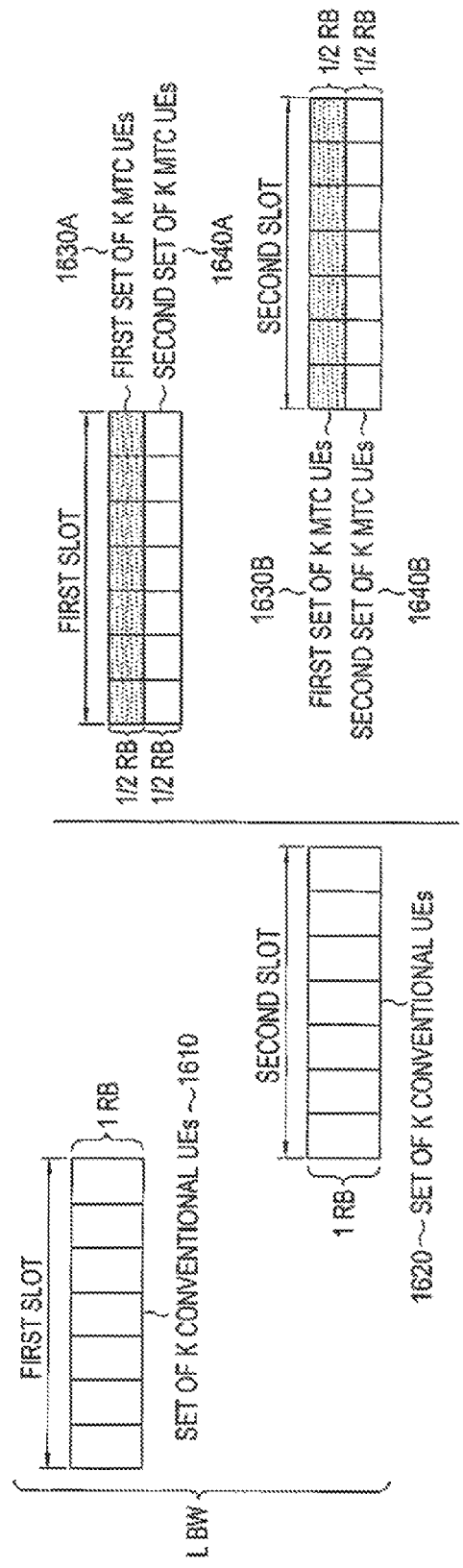
FIG. 16 is a diagram illustrating a second approach to increase a multiplexing capacity of periodic CSI transmissions from MTC UEs according to an embodiment of the present invention.

FIG. 16 is a diagram illustrating a second approach to increase a multiplexing capacity of periodic CSI transmissions from MTC UEs according to an embodiment of the present invention.

Referring to FIG. 16, a set of K conventional UEs transmit periodic CQI reports by multiplexing their transmissions over a RB in a first slot 1610 and in a second slot 1620 of a PUCCH subframe using respectively K different CS of a ZC sequence. A first set of K MTC UEs transmit periodic CQI reports by multiplexing their transmissions over half RB in a first slot 1630A and in a second slot 1630B of a PUCCH subframe using respectively K different CS of a ZC sequence and a second set of K MTC UEs transmit periodic CQI reports by multiplexing their transmissions over half RB in a first slot 1640A and in a second slot 1640B of a PUCCH subframe using respectively K different CS of a ZC sequence.

Another approach to increase a multiplexing capacity of periodic CQI transmissions for MTC UEs is to further reduce a number of bits for wideband CQI reports from 3 to 2 and report 4, instead of 7, CQI indexes. For example, reported indexes can be as in Table 3 (or by reporting every fourth of the 16 efficiencies in Table 1). A drawback of this approach is that there will be some loss in the spectral efficiency of PDSCH transmissions, because a granularity of wideband CQI reports is increased. However, as for typical DL SINR distributions, most MTC UEs are able to support a largest spectral efficiency for QPSK modulation that is still reported (this largest spectral efficiency captures all other ones corresponding to the use of QAM16 or QAM64 in Table 1 which are not applicable for MTC UEs), and therefore, a loss in spectral efficiency will be small.

An advantage of this approach is that, in addition to increased reliability of CQI feedback as a number of bits is decreased to 2, a PUCCH format used by conventional UEs for transmitting 2 HARQ-ACK bits can be used by MTC UEs for CQI reporting according to embodiments of the present invention, thereby increasing a multiplexing capacity by as much as a factor of 3, and also reducing UL overhead. Moreover, a single PUCCH structure can be used by MTC UEs to support HARQ-ACK transmissions, if necessary, as well as to support SR transmissions. If a UE is to transmit a CQI report in a same subframe as a HARQ-ACK signal, the UE can suspend transmission of the CQI report and transmit only the HARQ-ACK signal. Additionally, CQI feedback may have a nested structure with a first CQI reporting indicating a first value, as for example in Table 3, and a second CQI reporting indicating a second value that includes predetermined values around the first value. For example, the first CQI reporting (including 2 bits) may indicate a value of 0.6016 and the second CQI reporting (including 1 bit or 2 bits) may indicate one of the 0.3770 or 0.6016 values.

TABLE 3

2-bit CQI Table

| CQI Bits | CQI index | Modulation | code rate x 1024 | efficiency |
|---|---|---|---|---|
| 00 | 0 | | out of range | |
| 01 | 1 | QPSK | 120 | 0.2344 |
| 10 | 2 | QPSK | 308 | 0.6016 |
| 11 | 3 | QPSK | 602 | 1.1758 |

Figure 17:
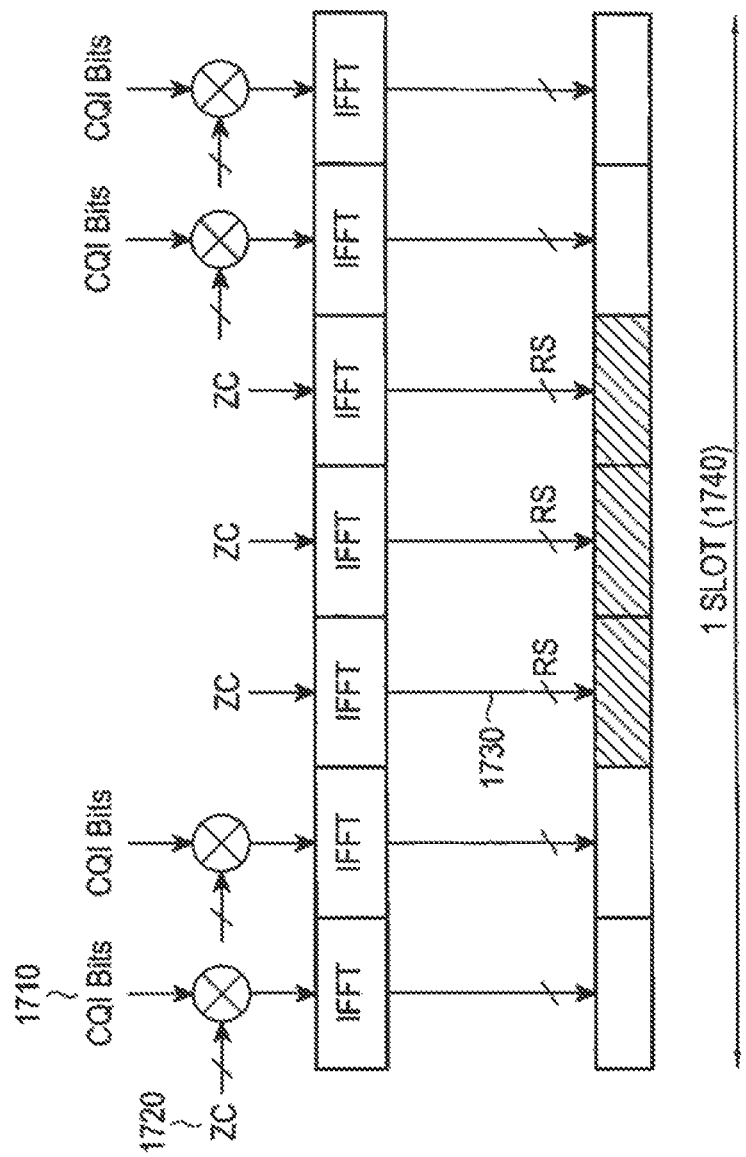
FIG. 17 is a diagram illustrating a third approach for increasing a multiplexing capacity of periodic CSI transmissions for MTC UEs according to an embodiment of the present invention.

FIG. 17 is a diagram illustrating a third approach for increasing a multiplexing capacity of periodic CSI transmissions for MTC UEs according to an embodiment of the present invention.

Referring to FIG. 17, a set of $K_1$ MTC UEs transmit periodic CQI reports by multiplexing the CQI bits 1710 with a ZC sequence 1720 and also transmitting an non-modulated ZC sequence for RS 1730 using the same structure per slot 1740 as conventional UEs use for HARQ-ACK signal transmissions.

A second functionality that needs to be modified for MTC UEs according to embodiments of the present invention compared to conventional UEs is the one of SRS transmissions that is not configured with a maximum SRS BW and hop in successive transmission instances in different BWs within the maximum SRS BW. Conventional UEs that are not configured, due to low SINR or due to overhead considerations, to transmit a SRS with a maximum BW can be configured by a NodeB to transmit SRS with a smaller BW and with location that is hopping within a maximum SRS BW over successive SRS transmission instances in order to scan in this way a maximum SRS BW.

SRS transmissions according to embodiments of the present invention may also be supported by an MTC UE in order to assist a network to determine an appropriate UL BW for PUSCH transmissions, for example by selecting an UL BW from a predetermined set of UL BWs where the MTC UE experiences favorable SINR for a signal transmission. The set of possible BWs, is signaled to the MTC UE by a NodeB through higher layer signaling. For example, to minimize UL BW fragmentation experienced for PUSCH transmissions by conventional UEs due to an allocation of UL BWs to MTC UEs, a number of possible UL BWs for an MTC UE may be limited towards the two edges of a total UL BW available for PUSCH transmissions. Therefore, it is inefficient for an MTC UE to transmit SRS in all BW parts of a maximum SRS BW configured for conventional UEs as these BW parts may not be allocated to the MTC UE.

Consequently, a modification to an SRS hopping pattern used by a conventional UE can be used for an MTC UE in order to include only UL BWs that a network may allocate to the MTC UE. A resulting modified SRS hopping pattern is described in U.S. patent application Ser. No. 12/986,620 titled "Enhancing Features of Uplink Reference Signals". When an SRS transmission is activated by a DCI format, an SRS transmission BW indicated by the DCI format can only belong to a predetermined set of UL BWs.

Figure 18:
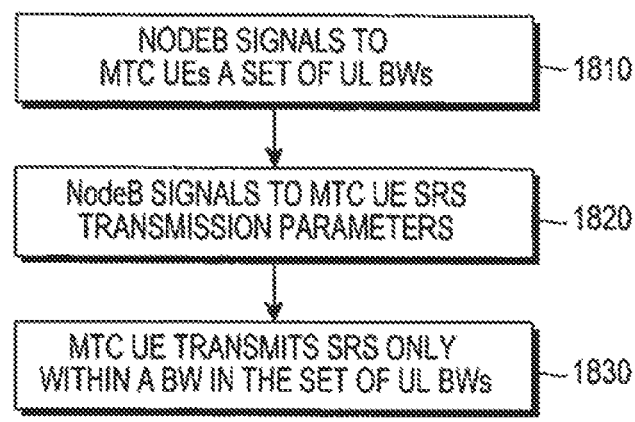
FIG. 18 is a diagram illustrating a process for an MTC UE to perform SRS transmissions according to an embodiment of the present invention.

FIG. 18 is a diagram illustrating a process for an MTC UE to perform SRS transmissions according to an embodiment of the present invention.

Referring to FIG. 18, an MTC UE is first informed by a NodeB, through higher layer signaling, of a set of UL BWs 1810. For example, a UL BW of 48 RBs can be divided into 8 BW parts of 6 RBs each, and a respective bit-map of 8 bits can indicate, to an MTC UE, the BW parts for an SRS transmission (for example, a binary 1 may indicate a BW part for SRS transmission and a binary 0 may indicate a BW part excluded from an SRS transmission). The MTC UE is also informed of a set of SRS transmission parameters, such as the SRS transmission BW, the SRS transmission period, and other parameters associated with the construction of the SRS, which can also be based on a ZC sequence 1820. The MTC UE transmits an SRS at each respective transmission instance only within a BW in the set of indicated UL BWs 1830 (the SRS transmission BW may not necessarily be the same as each UL BW in the set of UL BWs).

Due to RF re-tuning time requirements, which are typically in the range of a few transmission symbol intervals, it is not practically possible for an MTC UE to transmit in a same subframe control or data signals within one BW and SRS within another BW, if the transmission of control or data signals and the transmission of an SRS happen to coincide in the same subframe and be in different UL BWs. Therefore, in such a case, according to an embodiment of the present invention, an MTC UE suspends an SRS transmission and performs only transmission of control or data signals.

Although embodiments of the present invention described herein above refer to transmissions of control signals and data signals from an MTC UE within a same allocated BW, embodiments of the present invention are not limited to these examples, and transmission of control signals may be within a different allocated BW than transmission of data signals in accordance with embodiments of the present invention. A network may then configure an MTC UE to transmit a PUSCH within a first set of RBs and transmit a PUCCH within a second set of RBs. An MTC UE can tune its RF at an appropriate set of RBs and when the MTC UE needs to transmit both UCI and data information, the MTC UE can multiplex both in a PUSCH. One reason for configuring an MTC UE different sets of RBs for transmissions of control signals and data signals is to avoid congestion when MTC UEs are allocated several, common, RBs for PUCCH transmissions, since PUCCH multiplexing capacity per RB (up to 18 or 36 UEs) can be much larger than PUSCH multiplexing capacity per RB (typically only in the order of one UE). Another reason is to provide flexibility to a network in reserving a set of RBs for PUCCH transmissions by MTC UEs and utilize or not utilize another set of RBs for PUSCH transmissions by MTC UEs while also considering scheduling of conventional UEs.

Additionally, although embodiments of the present invention described herein above refer to MTC UEs completing the initial communication setup in a subset of the PRBs used for BCH transmission, such as for example the middle six PRBs in a DL BW, prior to being informed by higher layer signaling of another allocated DL BW, embodiments of the present invention are not necessarily be the case in practice. For example, in order to support communication in heterogeneous networks, interference coordination among different cells is needed for PDCCH transmissions that schedule, to MTC UEs, the reception of PDSCHs that provide initial configuration information and are less reliable than BCH transmissions.

A first alternative is for an MTC UE to implicitly derive a DL BW for communication after BCH detection and prior to detecting PDCCHs and respective PDSCHs conveying a higher layer control signaling that allocates a DL BW and other parameters for subsequent communication as a function of a NodeB (cell) identity that is provided by synchronization signals. For example, if a result of a modulo operation between a cell identity and a predetermined number (such as a subframe number) is zero, a first DL BW is used for subsequent DL communication for MTC UEs after BCH reception; otherwise, a second DL BW is used.

A second alternative is for an MTC UE to derive PRBs for communication after BCH detection to be a subset of the BCH PRBs based again on a cell identity. For example, if a result of a modulo operation between a cell identity and a predetermined number is zero, a first half of PRBs of BCH transmission is used for subsequent PDCCH and PDSCH transmissions; otherwise, a second half of PRBs of BCH transmission is used.

Figure 19:
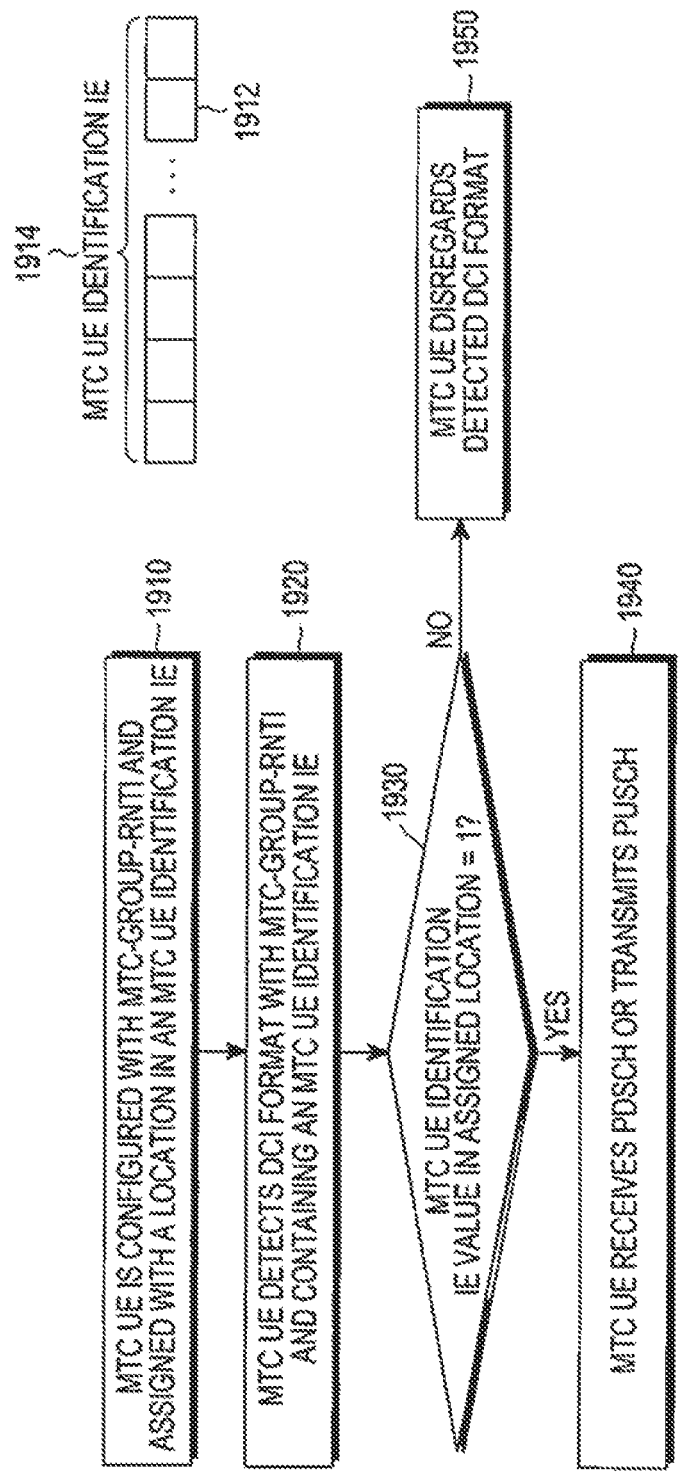
FIG. 19 is a diagram illustrating a DL BW determination by an MTC UE after BCH detection according to an embodiment of the present invention.

FIG. 19 is a diagram illustrating a DL BW determination by an MTC UE after BCH detection according to an embodiment of the present invention.

Referring to FIG. 19, an MTC UE first detects synchronization signals and the BCH and determines an identity of a respective cell 1910. Based on an outcome of a modulo operation between a cell identity and a predetermined number L 1920, the MTC UE determines a first DL BW for communication after BCH detection 1930 or a second DL BW for communication after BCH detection 1940. Although the method of FIG. 19 is performed according to the first of the previous two alternatives described herein above, extension of the method of FIG. 19 to the second of the previous alternatives is straightforward. Alternatively, the DL BW for communication after BCH detection may be indicated by the BCH.

Finally, as scheduling of PDSCH or PUSCH transmissions to or from an MTC UE, respectively, may not be needed in every subframe, as the applications for the MTC UE may not have strict latency requirements, the subframes possible for scheduling PDSCH or PUSCH to the MTC UE can be indicated from the NodeB through higher layer signaling. For example, a network may signal to an MTC UE a bit-map including X bits indicating respective X subframes where the network may transmit a DL SA or an UL SA to an MTC UE (for example, for binary '1' value) and subframes where the MTC UE may not transmit a DL SA or an UL SA to the MTC UE (for example, for binary '1' value). The set of X subframes may be determined with respect to a reference subframe such as for example the first subframe in a reference radio frame including multiple subframes. This approach can increase the instances where an MTC UE does not need to transmit or receive, thereby increasing the associated power savings.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for transmitting from a network a physical downlink shared channel (PDSCH) to a first user equipment (UE) from a first class of UEs or to a second UE from a second class of UEs, the method comprising the steps of:
    transmitting a PDSCH to the first UE using a first bandwidth unit; and
    transmitting a PDSCH within a first set of resource block (RBs) and a physical downlink control channel (PDCCH) within a second set of RBs to the second UE using a second bandwidth unit,
    wherein the second bandwidth unit is smaller than the first bandwidth unit; and
    wherein a reference signal associated with demodulating a PDSCH at the second UE is transmitted over the first bandwidth unit.

2. The method of claim 1, wherein the first bandwidth unit consists of 12 resource elements and the second bandwidth unit consists of 6 resource elements.

3. A user equipment (UE) apparatus from a first class of UEs for receiving a physical downlink shared channel (PDSCH), the apparatus comprising:
    a receiver for receiving a reference signal over a first bandwidth unit and for receiving a data signal transmitted within a first set of resource blocks (RBs) and a physical downlink control channel (PDCCH) within a second set of RBs over a second bandwidth unit wherein the second bandwidth unit is smaller than the first bandwidth unit; and
    a demodulator for demodulating the data signal using the reference signal; and
    wherein a reference signal associated with demodulating a PDSCH at another UE from a second class of UEs is transmitted over the first bandwidth unit.

4. The apparatus of claim 3, wherein the first bandwidth resource unit consists of 12 resource elements and the second bandwidth unit consists of 6 resource elements.

5. A method for receiving by a network a physical uplink shared channel (PUSCH) from a first user equipment (UE) from a first class of UEs or from a second UE from a second class of UEs, the method comprising:
    receiving a PUSCH from the first UE using a first bandwidth unit; and
    receiving a PUSCH within a first set of resource block (RBs) and a physical uplink control channel (PUCCH) within a second set of RBs from the second UE using a second bandwidth unit,
    wherein the second bandwidth unit is less than the first bandwidth unit; and
    wherein a reference signal associated with demodulating a PDSCH at the second UE is transmitted over the first bandwidth unit.

6. The method of claim 5, wherein the first bandwidth unit consists of 12 resource elements and the second bandwidth unit consists of 6 resource elements.

7. An apparatus for transmitting from a network a physical downlink shared channel (PDSCH) to a first user equipment (UE) from a first class of UEs or to a second UE from a second class of UEs, the apparatus comprising:
    a transmitter for transmitting a PDSCH to the first UE using a first bandwidth unit and transmitting a PDSCH within a first set of resource block (RBs) and a physical downlink control channel (PDCCH) within a second set of RBs to the second UE using a second bandwidth unit,
    wherein the second bandwidth unit is smaller than the first bandwidth unit; and
    wherein a reference signal associated with demodulating a PDSCH at the second UE is transmitted over the first bandwidth unit.

8. The apparatus of claim 7, wherein the first bandwidth unit consists of 12 resource elements and the second bandwidth unit consists of 6 resource elements.

9. An apparatus for receiving a physical uplink shared channel (PUSCH) from a first user equipment (UE) from a first class of UEs or from a second UE from a second class of UEs, the apparatus comprising:
    a receiver for receiving a PUSCH from the first UE using a first bandwidth unit and receiving a PUSCH within a first set of resource block (RBs) and a physical uplink control channel (PUCCH) within a second set of RBs from the second UE using a second bandwidth unit,
    wherein the second bandwidth unit is less than the first bandwidth unit; and wherein a reference signal associated with demodulating a PDSCH at the second UE is transmitted over the first bandwidth unit.

10. The apparatus of claim 8, wherein the first bandwidth unit consists of 12 resource elements and the second bandwidth unit consists of 6 resource elements.

11. A method by a user equipment (UE) from a first class of UEs for receiving a physical downlink shared channel (PDSCH), the method comprising:
   receiving a reference signal over a first bandwidth unit and receiving a data signal transmitted within a first set of resource blocks (RBs) and a physical downlink control channel (PDCCH) within a second set of RBs over a second bandwidth unit, wherein the second bandwidth resource unit is smaller than the first bandwidth unit; and
   demodulating the data signal using the received reference signal; and
   wherein a reference signal associated with demodulating a PDSCH at another UE from a second class of UEs is transmitted over the first bandwidth unit.

12. The method of claim 10, wherein the first bandwidth resource unit consists of 12 resource elements and the second bandwidth unit consists of 6 resource elements.

* * * * *